(12) United States Patent
Piett et al.

(10) Patent No.: US 6,529,908 B1
(45) Date of Patent: Mar. 4, 2003

(54) WEB-UPDATED DATABASE WITH RECORD DISTRIBUTION BY EMAIL

(75) Inventors: Derrick Ronald Piett, West Vancouver (CA); Anthony James McAleer, Vancouver (CA); Peter Cellik, Burnaby (CA)

(73) Assignee: Netspan Corporation, Grand Turk (KN)

( * ) Notice: Subject to any disclaimer, the term of this patent is extended or adjusted under 35 U.S.C. 154(b) by 0 days.

(21) Appl. No.: 09/086,079

(22) Filed: May 28, 1998

(51) Int. Cl.⁷ ............................................... G06F 17/30
(52) U.S. Cl. .............................. 707/10; 1/102; 709/203
(58) Field of Search ................................ 707/104, 103, 707/10, 1, 100, 102, 104.1; 709/200, 203, 217–219

(56) References Cited

U.S. PATENT DOCUMENTS

| | | | | |
|---|---|---|---|---|
| 5,664,115 A | * | 9/1997 | Fraser | 705/37 |
| 5,819,285 A | * | 10/1998 | Damico et al. | 707/104.1 |
| 5,826,270 A | * | 10/1998 | Rutkowski et al. | 707/10 |
| 5,930,474 A | * | 7/1999 | Dunworth et al. | 709/217 |
| 6,018,570 A | * | 1/2000 | Matison | 379/207.15 |
| 6,029,175 A | * | 2/2000 | Chow et al. | 707/104 |
| 6,175,831 B1 | * | 1/2001 | Weinreich et al. | 707/10 |

FOREIGN PATENT DOCUMENTS

| | | | | |
|---|---|---|---|---|
| EP | 0 216 535 A2 | 4/1987 | | |
| EP | A-0 646 857 | 9/1994 | ........... | G06F/3/033 |
| EP | 0 838 774 A2 | 4/1998 | | |
| GB | A-2 291 228 | 1/1996 | ........... | G06F/17/30 |

OTHER PUBLICATIONS

Thomas Ball and Fred Douglis, "In Internet Difference Engine and its Applications", Proceedings of COMPCON '96, pp. 71–76, 1996.

* cited by examiner

Primary Examiner—John Breene
Assistant Examiner—Cheryl Lewis
(74) Attorney, Agent, or Firm—Knobbe Martens Olson & Bear LLP

(57) ABSTRACT

A remotely updatable database system method and computer readable medium. The system includes a user interface, a database of information records, a database manager, and a message server. The system functions generally according to the method, such that the user interface is for communicating with at least one subscriber system to receive user input from a user at the at least one subscriber system. In addition, the database manager is in communication with the user interface, for controlling the database such that each information record is associated with at least one user, and for amending the information records in response to user input received at the user interface from the at least one subscriber system. The message server is in communication with the database manager for serving a message including at least one record received from the database manager to the at least one user associated with the information record. Computer readable codes are stored on the computer readable medium and are readable by a computer to direct the computer to perform the steps of the method.

100 Claims, 32 Drawing Sheets

DATABASE = RAPIER
TABLE = USERS — 62

| FIELD | TYPE | LENGTH | NOT NULL | KEY |
|---|---|---|---|---|
| 64 — USERNAME | CHAR | 50 | Y | Y |
| 66 — Email | CHAR | 50 | N | N |
| 68 — PASSWORD | CHAR | 20 | N | N |
| 70 — BUILDINGOWNER | INT | 4 | N | N |
| 72 — APPROVED | CHAR | 1 | N | N |

FIG. 3

DATABASE = RAPIER
TABLE = ACCESS — 74

| FIELD | TYPE | LENGTH | NOT NULL | KEY |
|---|---|---|---|---|
| 76 — BUILDINGID | INT | 4 | N | N |
| 78 — USERNAME | CHAR | 50 | N | N |
| 80 — BUILDINGOWNER | INT | 4 | N | N |

FIG. 4

DATABASE = RAPIER
TABLE = REGION — 82

| FIELD | TYPE | LENGTH | NOT NULL | KEY |
|---|---|---|---|---|
| REGIONID | CHAR | 32 | N | N |
| REGIONNAME | CHAR | 50 | N | N |
| REGIONPRINT | CHAR | 50 | N | N |
| REFRESHFILE | CHAR | 16 | N | N |
| AREASTRING | CHAR | 50 | N | N |
| RENTALSTRING | CHAR | 50 | N | N |
| RENTSTRING | CHAR | 50 | N | N |
| ZONECOUNT | INT | 4 | N | N |
| ZONE1 | CHAR | 50 | N | N |
| ZONE2 | CHAR | 50 | N | N |
| ZONE3 | CHAR | 50 | N | N |
| ZONE4 | CHAR | 50 | N | N |
| ZONE5 | CHAR | 50 | N | N |
| ZONE6 | CHAR | 50 | N | N |
| ZONE7 | CHAR | 50 | N | N |
| ZONE8 | CHAR | 50 | N | N |

84 → REGIONPRINT

DATABASE = RAPIER  
TABLE = BUILDING — 90

| | FIELD | TYPE | LENGTH | NOT NULL | KEY |
|---|---|---|---|---|---|
| 98 | USERNAME | CHAR | 50 | N | N |
| 100 | REGIONID | CHAR | 32 | N | N |
| 102 | BUILDINGID | INT | 4 | N | N |
| 104 | BUILDING CODE | INT | 4 | N | N |
| 106 | NAME | CHAR | 250 | N | N |
| 108 | ADDRESS | CHAR | 250 | N | N |
| 110 | ZONE | INT | 4 | N | N |
| 112 | LOCATION | CHAR | 250 | N | N |
| 114 | DESCRIPTION | CHAR | 1024 | N | N |
| 116 | IMAGEFILENAME | CHAR | 10 | N | N |
| 118 | UNITIMAGEFILENAME | CHAR | 10 | N | N |
| 120 | LEASETYPE | INT | 4 | N | N |
| 122 | LEASETERM | INT | 4 | N | N |
| 124 | LEASEOPTION | INT | 4 | N | N |
| 126 | RENTREVIEW | INT | 4 | N | N |
| 128 | AVAILABILITY | INT | 4 | N | N |
| 130 | OUTGOINGSDATE | INT | 4 | N | N |
| 132 | OUTGOINGS | INT | 4 | N | N |
| 134 | CLEANING | INT | 4 | N | N |
| 136 | PARKING | INT | 4 | N | N |
| 138 | ACCESS | INT | 4 | N | N |
| 140 | LEGALCOSTS | INT | 4 | N | N |
| 142 | SIGNAGE | INT | 4 | N | N |
| 144 | STRUCTURALFLAGS | INT | 4 | N | N |
| | HIGHLOADPOSSIBLE | REAL | 8 | N | N |
| | WOOLCARPETPERCE | INT | 4 | N | N |
| | CARPETGRADE | INT | 4 | N | N |
| | CARPETCOLOURS | INT | 4 | N | N |
| | FLOORWITHINPERI | INT | 4 | N | N |
| | GENERALLOADRATING | REAL | 8 | N | N |
| | HEAVEYLOADRATING | REAL | 8 | N | N |
| | COLUMNS | INT | 4 | N | N |
| | NATURALLIGHT | INT | 4 | N | N |
| | GENERALFLAGS | INT | 4 | N | N |

| | | | | | | |
|---|---|---|---|---|---|---|
| | | FLOORSIZE 190 192 | INT | 4 | N | N |
| | | LEVELS 148 | INT | 4 | N | N |
| | 3 | AIRCONDFLAGS | INT | 4 | N | N |
| | | MINIMUMFLOORZONE | INT | 4 | N | N |
| | | TYPICALFLOORZONE | INT | 4 | N | N |
| 168 | | CONDHEATLOAD | REAL | 8 | N | N |
| | | AFTERHOURCOND | INT | 4 | N | N |
| | | TEMPERATURE | REAL | 8 | N | N |
| | | CONDITIONINGHOU 150 | INT | 4 | N | N |
| | 3 | FIRESAFTYFLAGS 152 | INT | 4 | N | N |
| | 3 | SECURITYFLAGS 154 | INT | 4 | N | N |
| | 4 | COMMFLAGS | INT | 4 | N | N |
| 170 | | MATV | INT | 4 | N | N |
| | 4 | ELECTRICALFLAGS 156 | INT | 4 | N | N |
| | | SITECAPACITY | REAL | 8 | N | N |
| | | LIGHTINGLUX | INT | 4 | N | N |
| 172 | | FLOORCAPACITY | REAL | 8 | N | N |
| | | ELECTRICALHEATL | REAL | 8 | N | N |
| | | DIESELGENERATOR | INT | 4 | N | N |
| | 4 | LIFTFLAGS 158 | INT | 4 | N | N |
| 96 | | HIGHSPEEDLIFTS | INT | 4 | N | N |
| | | LOWRISELIFTS | INT | 4 | N | N |
| 174 | | HIGHRISELIFTS | INT | 4 | N | N |
| | | CARPARKLIFTS | INT | 4 | N | N |
| | | DEPARTUREINTERV 160 | REAL | 8 | N | N |
| | 4 | HYDRAULICFLAGS 162 | INT | 4 | N | N |
| | 4 | INCENTIVEFLAGS | INT | 4 | N | N |
| | | FIRSTYEARFEE | REAL | 8 | N | N |
| | | AVERAGEANNUALFEE | REAL | 8 | N | N |
| | | SCALENAME | CHAR | 150 | N | N |
| | | SCALEPERCENT | INT | 4 | N | N |
| | | PERMETREFEE | INT | 4 | N | N |
| | | FLATDATE | INT | 4 | N | N |
| 176 | | FLATFEE | INT | 4 | N | N |
| | | OWNERPERMETREFEE | INT | 4 | N | N |
| | | FEEAREA | INT | 4 | N | N |
| | | FEEAMOUNT | INT | 4 | N | N |
| | | EXPIREFEE | INT | 4 | N | N |
| | | COMMENTS | CHAR | 1024 | N | N |
| | | DATESTAMPSENT | INT | 4 | N | N |
| | | DATESTAMPCHANGE | INT | 4 | N | N |

FIG. 6B

| | | |
|---|---|---|
| LegalCosts as Long  *140* | ' 0 = <nothing><br>' 1 = The lessee will be responsible for all legal costs associated with the transaction<br>' 2 = Each party is responsible for their own legal costs associated with the transaction | |
| Signage as Long  *142* | ' 0 = <nothing><br>' 1 = Naming rights are available by negotiation<br>' 2 = Signage rights are available by negotiation<br>' 3 = Naming and signage rights are available by negotiation | |
| Comments as String | ' Open text up to 80 characters | |
| LeaseType as Long  *120* | ' For Australia:<br>' 0 = Direct<br>' 1 = Sub Lease<br>' 2 = Assignment<br>' 3 = Other | For USA:<br>' 0 = Direct<br>' 1 = Sublet |
| LeaseTerm as Long  *122* | ' Decimal Digits:   TDDMMYYYY<br>' T = Type<br>'<br>'<br>'<br>'<br>' | 0 = Negotiable<br>1 = Term until DD/MM/YYYY<br>2 = Maximum of YY years<br>3 = Minimum of YY years<br>4 = Maximum of YY months<br>5 = Minimum of YY months |
| LeaseOption as Long  *124* | ' Decimal Digits:   TXXYY<br>' T = Type<br>'<br>'<br>'<br>'<br>' | 0 = Negotiable<br>1 = YY years<br>2 = XX+YY years available<br>3 = Nil<br>4 = None available<br>5 = By negotiation |
| RentReview as Long  *126* | ' Decimal Digits:   TXXYY<br>' T = Type<br>'<br>'<br>'<br>'<br>' | 0 = Negotiable<br>1 = The rent will be reviewed to market on a YY yearly basis<br>2 = YY yearly to market<br>3 = By negotiation<br>4 = The rent will be fixed for YY years and reviewed XX yearly to market thereafter |

FIG. 7A

| | | 5 = The rent will be reviewed to market on a YY yearly basis but not less than the preceding years rental |
|---|---|---|
| | | 6 = The rent will be reviewed to market on a YY yearly basis, subject to a ratchet clause |
| Availability as Long ↑ 128 | '-1 = Immediate '-2 = Now ' else = As at DD/MM/YYYY (if DD=C then MONTH YYYY) | |
| Outgoingsdate as Long | 'Decimal Digits: DDMMYYYY | |
| Outgoings as Long ↑ 130 | 'Decimal Digits: TXXX ' T = Type | 0 = A pro-rata percentage of total building outgoings |
| | | 1 = A pro-rata percentage of total building outgoings currently estimated at $xxx psmpa |
| | | 2 = A pro-rata percentage of total building outgoings current estimated at $xxx psmpa for year ended DD/MM/YYYY |
| | | 3 = A pro-rata percentage of increases in building outgoings over a base year dated DD/MM/YYYY |
| | | 4 = A pro-rata percentage of increases in building outgoings over a base year period |
| Cleaning as Long ↑ 134 | 'Decimal Digits: TXXXX ' T = Type | 0 = The lessee will be billed actual cost of cleaning |
| | | 1 = The lessee will be billed actual cost of same |
| | | 2 = The lessee will be billed actual cost of same, currently estimated at $XXXX, psmpa |
| | | 3 = The lessee will be billed the actual cost of individual tenancy areas and a proportionate percentage of common area cleaning costs |
| | | 4 = The lessee will be billed the actual cost of individual tenancy areas and a proportionate percentage of common area cleaning costs, currently estimated at $XXXX psmpa |
| | | 5 = Additional to the base rental and currently estimated at $XXXX psmpa |
| Parking as Long ↑ 136 | 'Decimal Digits: TYYYYXXXX ' T = Type | 0 = Parking is available under separate license agreement |
| | | 1 = Parking is available by negotiation |

FIG. 7B

2 = Parking is available in several public parking stations in the vicinity

3 = Parking is available under separate license at approximately $xxxx per space per calendar month 4 = There is ample parking available by negotiation 5 = Parking is available on a ratio of 1 space per xxxx square metres leased 6 = Parking is available at $xxxx per space per month 7 = YYYY basement spaces are available at $xxxx per space per calendar month Access as Long ' Decimal Digits: TXX
' T = Type 0 = Upon completion of fitout 1 = Subject to completion of lease documentation and provision of relevant guarantees

138

2 = Upon execution of satisfactory lease documentation and the provision of a XXX month bank guarantee 3 = Upon execution of lease documentation, the provision of relevant guarantees and receipt of a rental deposit equivalent to XXX months rental

FIG. 7B
*(CONTINUED)*

LSB 163
2093727

MSB

STRUCTURAL
1    ANTI STATIC CARPET
F 1    PREMIUM QUALITY CARPET TILES
1    BREAKOUT PANELS ENABLING INTERNAL STAIRCASES
1    COMPACTUS/HIGH LOADING FLOOR AREAS
1    LARGE LOADING DOCK
A 0    LOADING FACILITIES AVAILABLE
0    MECHANICALLY VENTED CAR PARK
1    CARBON DIOXIDE PROTECTION SYSTEM IN CAR PARK
0    TELELIFT DOCUMENT DISTRIBUTION SYSTEM
1    GROUND FLOOR SHOWERS
2 0    GROUND FLOOR LOCKERS
0    GROUND FLOOR BIKE RACKS
1    DISABLED ACCESS AND TOILETS
F 1    DOUBLE GLAZED HIGH PERFORMANCE REFLECTIVE GLASS
1    COLUMN FREE FLOORS
1    GOOD NATURAL LIGHT
1    OPEN AIR BALCONIES ON SOME FLOORS
F 1    FLOOR TO CEILING GLASS
1    LOW GLARE HIGH PERFORMANCE REFLECTIVE GLASS
1    TOUCH SCREEN TENANT INFORMATION BOARD
1    BUILDING AUTOMATION SYSTEM FEATURING DIRECT DIGITAL CONTROL
1 0    AUTOMATIC DIALING SYSTEMS
0    BACKGROUND MUSIC FOR PUBLIC AREAS
0    PROVISION FOR EXECUTIVE WASHROOMS; BAR FACILITIES AND KITCHENS

FIG. 8A

GENERAL
0 CONVENTION FACILITIES AVAILABLE FOR TENANT USE
0 OPEN AIR GARDEN TERRACE FOR TENANT USE
0 UNDERGROUND RETAIL CONNECTIONS
0 CLOSE TO THE COURTS
0 ROOFTOP ENTERTAINMENT AREA AVAILABLE FOR TENANT USE
0 SWIMMING POOL AVAILABLE FOR TENANT USE
0 NAMING AND SIGNAGE AVAILABLE
1 ON SITE MANAGEMENT OFFICE
0 UNDERCOVER ACCESS TO THE BUILDING
0 24 HOUR A DAY TENANT SERVICE CENTRE AVAILABLE TO DEAL WITH TENANT CONCERNS
0 NEARBY HOTEL FACILITIES
0 NEARBY FITNESS CENTER
1 GOOD ACCESS TO PUBLIC TRANSPORT

FIG. 8B

AIR CONDITIONING
1 24 HOUR;7 DAY OPERATION OR ANY PART THEREOF IS AVAILABLE
0 DIGITAL CONTROL SYSTEMS
0 AFTER HOURS KEY CONTROL
0 CHILLED WATER FROM CENTRAL PLANT
0 VARIABLE VOLUME AIR CONDITIONING
1 CONDENSER WATER SYSTEM FOR SUPPLEMENTARY AIR CONDITIONING REQUIREMENTS
0 DEDICATED FRESH AIR RISER
0 KITCHEN EXHAUST PROVISION
0 PERIMETER AIR CONDITIONING
0 ZONED AIR CONDITIONING
1 AFTER HOURS DIAL UP AIR CONDITIONING AVAILABLE
0 FLOOR BY FLOOR VARIABLE AIR CONDITIONING SYSTEM
0 A SEPARATE CONDENSED WATER RETICULATION LOOP IS PROVIDED TO SERVE SUPPLEMENTARY PLANT REQUIREMENTS (COMPUTER AND CONFERENCE ROOMS; TRADING AREAS)
0 CENTRAL CHILLED WATER PLANT WITH AIR HANDLING PLANT ON EACH FLOOR
0 WHOLE BUILDING AIR CONDITIONING
0 ABILITY TO CREATE ADDITIONAL ZONES WITH PROVISION FOR SPECIAL ENVIRONMENTS
0 FLOOR BY FLOOR OPERATION PROVIDED BY INDIVIDUAL FLOOR MOUNTED FAN COIL UNITS
0 FULLY PROGRAMMABLE AFTER HOURS OPERATION
0 OUTSIDE AIR ECONOMY CYCLE FOR LOW COST OPERATION
0 DUCT HEATING ELEMENTS

FIG. 8C

FIRE SAFETY
FULLY AUTOMATIC SPRINKLER SYSTEM
STAIRWELL PRESSURIZATION
EMERGENCY WARNING AND INTERCOMMUNICATION SYSTEM
FIRE CONTROL ROOM
EARLY WARNING SMOKE DETECTION SYSTEM

FIG. 8D

SECURITY
24 HOURS A DAY MANNED SECURITY OPERATIONS ROOM
CARD KEY ACCESS CONTROL AFTER HOURS
PROXIMITY READERS CAN BE PROVIDED
CLOSED CIRCUIT TV MONITORING OF SELECTED PUBLIC AND PRIVATE AREAS
CARD KEY SYSTEM IS EXPANDABLE TO MEET INDIVIDUAL REQUIREMENTS
CONCIERGE
DKS SECURITY AND MANAGEMENT SYSTEM
MICROPROCESSOR BASED KEY CARD ACCESS SYSTEM
AFTER HOURS ACCESS COMPUTER PRINTOUTS AVAILABLE
DIRECT DIALING SYSTEMS
PROGRAMMABLE LIFT OPERATION FOR INDIVIDUAL FLOOR SECURITY
INTRUDER ALARMS IN PLACE
COMPUTERIZED ACCESS CONTROL SYSTEM
24 HOUR ACCESS TO BUILDING AND CAR PARK BY DKS SECURITY KEY

FIG. 8E

COMM
DEDICATED DATA / COMMUNICATIONS RISER
DUCTED SKIRTING FLOOR TO CEILING ACCESS AT COLUMNS
MASTER ANTENNA TELEVISION SYSTEM IN PLACE
PROVISION FOR SATELLITE DISH OR MICROWAVE FACILITIES
TELECOM STANDARD BLOCK CABLING SYSTEM
2700mm CEILING HEIGHT ALLOWS FOR INSTALLATION OF COMPUTER ACCESS FLOORS
A DATA CABLING RISER IS AVAILABLE TO ALL OFFICE LEVELS
ACCESS FLOORING IN PLACE
CENTRAL PABX
SATELLITE DISH
FIBER OPTIC CABLING
HIGH SPEED INTERNET ACCESS
BLOCK CABLING SYSTEM IN PLACE TO ALLOW TELEPHONE LINE UPGRADES
INFRARED CAPACITY TO CATER FOR CORDLESS TELEPHONE INSTALLATION

FIG. 8F

ELECTRICAL
HIGH EFFICIENCY LIGHTING TUBES
EMERGENCY LIGHTING SYSTEM
RECESSED FLUORESCENT LIGHTING
LOW BRIGHTNESS LIGHTING FIXTURES
TRIPLE CHANNEL DUCTED PERIMETER SKIRTING TO WALLS AND COLUMNS
INDEPENDENT DEDICATED SUBSTATION
ADDITIONAL HEAT LOAD PROVISION VIA A CONDENSER WATER LOOP
AUTOMATIC STANDBY POWER TO ESSENTIAL SERVICES
EMERGENCY POWER GENERATION SIZED TO ALLOW BUILDING OCCUPATION DURING POWER FAILURE

FIG. 8G

LIFTS
GOODS LIFT AVAILABLE
CARD KEY READERS FOR AFTER HOURS SECURITY
CAR PARK LIFT ACCESS

FIG. 8H

HYDRAULICS
MALE AND FEMALE TOILETS AT EACH LEVEL
KITCHENETTE AT EACH LEVEL
FACILITY FOR ENSUITES; BARS AND COMMERCIAL KITCHENS ON A TYPICAL FLOOR
INSTALLATION OF ADDITIONAL PRIVATE FACILITIES IS POSSIBLE
TEA ROOM INCLUDES BOILING WATER UNIT AND A CHILLED WATER DRINKING SYSTEM
DISHWASHER
REFRIGERATOR

FIG. 8I

INCENTIVES
PERSONAL INCENTIVES AVAILABLE

FIG. 8J

AGENTS NOTES DATA:

164 {
StructuralFlags as Long
HighLoadPossible as Long     ' High load areas possible up to X.X kpa/m$^2$
WoolCarpetPercent as Long     ' High quality commercial weight XX wool carpet
CarpetGrade as Long     ' High performance commercial grade x oz carpet
CarpetColour as Long     ' X carpet colours to select
FloorwithinPerimeter as Long     ' Decimal Digits: XXXYYY
    ' XXX% of floor within YYY meters of the perimeter
GeneralLoadRating as Long     ' General area load rating: X.X kpa
HeavyLoadRatin as Long     ' Heavy area load rating: X.X kpa
Columns as Long     ' Only X columns per floor
NaturalLight as Long     ' Natural light on X sides
}

FIG. 9A

166 {
GeneralFlags as Long
FloorSite as Long     ' Typical floor site is X m$^2$     194
Levels as Long     ' Total number of levels is X     196
}

FIG. 9B

168 {
AirConditioningFlags as Long
MinimumFloorZones as Long     ' Minimum of Y zones per average floor
TypicalFloorZones as Long     ' Up to X zones per typical floor
ConditioningHeatLoad as Long     ' Floor equipment/heat load capacity of X.X watts/m$^2$
AfterHourConditioning as Long     ' After hours air conditioning costs currently running
    at $x per hour
Temperature as Long     ' Average temperature X.X° Celsius
ConditioningHours as Long     ' Decimal Digits: XXYY
    ' Air conditioning hours of operation X AM to Y PM
}

FIG. 9C

FireSafetyFlags as Long

FIG. 9D

SecurityFlags as Long

CommunicationFlags as Long
MATV as Long     ' MATV system allowing up to X outlets per floor

FIG. 9F

172 {
- ElectricalFlags as Long
- SiteCapacity as Long  ' Site capacity X.X watts/m²
- FloorCapacity as Long  ' Tenant floor capacity X.X watts/m²
- LightingLux as Long  ' Lighting X Lux
- ElectricalHeatLoad as Long  ' Electrical heat load = x.x watts/m²
- DieselGenerator as Long  ' Decimal Digits: XXXYYYZZZ
  Diesel backup generators to provide essential services (lifts, Y% lighting, Z% general power)

FIG. 9G

174 {
- LiftFlags as Long
- HighSpeedLifts as Long  ' X high speed lifts
- LowRiseLifts as Long  ' X low rise, high speed lifts
- HighRiseLifts as Long  ' X high rise, high speed lifts
- CarParkLifts as Long  ' X car park lift(s)
- DepartureInterval as Long  ' interval of car departure < x.x seconds

FIG. 9H

HydraulicFlags as Long

FIG. 9I

176 {
- IncentiveFlags as Long
- FirstYearFee as Long  ' X.X% of the first year's gross rental
- AverageAnnualFee as Long  X.X% of the average annual gross rental
- ScaleName as String
- ScalePercent as Long  X% of the SCALENAME scale of fees and charges
- PerMetreFee as Long  $X per square meter leased
- FlatDate as Long
- FlatFee as Long  Flat fee of $ if leased by FLAT DATE
- OwnerPerMeterFee as Long  The owner is prepared to offer personal incentives to a value of $X pam leased to the successful agent for signed leases only. If company policy does not allow this the equivalent value can be taken as leasing fees
- FeeArea as Long
- FeeAmount as Long  A personal incentive of $X is available for leasing in excess of X m²
- ExpireFee as Long  The offer of personal incentives expires on DD/MM/YYYY

FIG. 9J

DATABASE = RAPIER
TABLE = UNIT

200

| FIELD | TYPE | LENGTH | NOT NULL | KEY |
|---|---|---|---|---|
| 202 — UNITID | INT | 4 | N | N |
| 204 — BUILDINGID | INT | 4 | N | N |
| 206 — UNITFLAGS | INT | 4 | N | N |
| 208 — LEVEL | CHAR | 4 | N | N |
| 210 — SUITE | CHAR | 4 | N | N |
| 212 — MAXIMUMAREA | REAL | 8 | N | N |
| 214 — MINIMUMAREA | REAL | 8 | N | N |
| 216 — RENTAL | REAL | 8 | N | N |
| 217 — UOUTGOINGS | REAL | 8 | N | N |
| 218 — WAREHOUSING | INT | 4 | N | N |
| 219 — REMARKS | CHAR | 32 | N | N |
| 221 — FLOORPLANIMAGE | CHAR | 8 | N | N |
| 221 — PICTUREIMAGE | CHAR | 8 | N | N |
| 223 — DATESTAMPSENT | INT | 4 | N | N |
| 225 — DATESTAMPCHANGE | INT | 4 | N | N |

| GATEWAY ||
|---|---|
| 1 MACQUARIE PLACE; SYDNEY | SYDNEY |

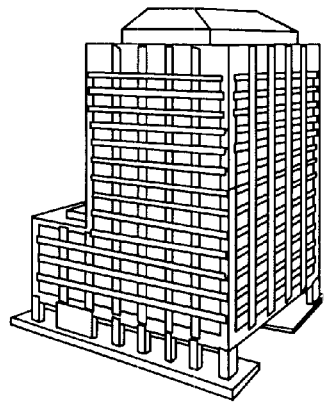

LOCATION:

> SITUATED AT CIRCULAR QUAY; OPPOSITE TRAIN; BUS AND FERRY SERVICES AND OVERLOOKING SYDNEY HARBOR.

DESCRIPTION:

> GATEWAY IS ONE OF SYDNEYS PREMIER LANDMARK TOWERS OVERLOOKING SYDNEY HARBOR. COMPLETED IN 1990 IT OFFERS THE LATEST IN SERVICES AND TECHNOLOGY. GATEWAY IS HOME TO NATIONAL AND INTERNATIONAL ORGANIZATIONS. THE BUILDING IS SERVED BY THREE RISES WITH LOW RISE FLOORS OF APPROX 1,150 sq m.; AND THE HIGH RISE FLOORS OF APPROX 1,242 sq.m. STILL AVAILABLE. INCLUDED IN THE RANGE OF SERVICES ARE BASEMENT SHOWER FACLITIES FOR STAFF.

AREA DETAILS:
    NO FIELD

| GATEWAY |
| 1 MACQUARIE PLACE; SYDNEY | SYDNEY |

AGENTS NOTES:

STRUCTURAL AND DESIGN SELLING FEATURES:
+ ANTI STATIC CARPET
+ PREMIUM QUALITY CARPET TILES
+ BREAKOUT PANELS ENABLING INTERNAL STAIRCASES
+ COMPACTUS/HIGH LOADING FLOOR AREAS
+ LARGE LOADING DOCK
+ CARBON DIOXIDE PROTECTION SYSTEM IN CAR PARK
+ GROUND FLOOR SHOWERS
+ DISABLED ACCESS AND TOILETS
+ DOUBLE GLAZED HIGH PERFORMANCE REFLECTIVE GLASS
+ COLUMN FREE FLOORS
+ GOOD NATURAL LIGHT
+ OPEN AIR BALCONIES SOME FLOORS
+ FLOOR TO CEILING GLASS
+ LOW GLARE HIGH PERFORMANCE REFLECTIVE GLASS
+ TOUCH SCREEN TENANT INFORMATION BOARD
+ BUILDING AUTOMATION SYSTEM FEATURING DIRECT DIGITAL CONTROL

GENERAL SELLING FEATURE:
+ ON SITE MANAGEMENT OFFICE
+ GOOD ACCESS TO PUBLIC TRANSPORT
+ TYPICAL FLOOR SIZE IS 1243 m$^2$
+ TOTAL NUMBER OF LEVELS IS 46

AIR CONDITIONING:
+ 24 HOUR; 7 DAY OPERATION OR ANY PART THEREOF IS AVAILABLE
+ CONDENSER WATER SYSTEM FOR SUPPLEMENTARY AIR CONDITIONING REQUIREMENTS
+ AFTER HOURS DIAL UP AIR CONDITIONING AVAILABLE
+ UP TO 20 ZONES PER TYPICAL FLOOR

FIRE AND LIFT SAFETY:
+ FULLY AUTOMATIC SPRINKLER SYSTEM
+ STAIRWELL PRESSURIZATION
+ EMERGENCY WARNING AND INTERCOMMUNICATION SYSTEM
+ FIRE CONTROL ROOM
+ EARLY WARNING SMOKE DETECTION SYSTEM

SECURITY:
+ 24 HOURS A DAY MANNED SECURITY OPERATIONS ROOM
+ CARD KEY ACCESS CONTROL AFTER HOURS
+ CONCIERGE
+ AFTER HOURS ACCESS COMPUTER PRINTOUTS AVAILABLE
+ INTRUDER ALARMS IN PLACE

FIG. 14A

| GATEWAY | |
|---|---|
| 1 MACQUARIE PLACE; SYDNEY | SYDNEY |

DATA / COMMUNICATION FACILITIES:
+ DEDICATED DATA/COMMUNICATIONS RISER
+ PROVISION FOR SATELLITE DISH OR MICROWAVE FACILITIES
+ 2700mm CEILING HEIGHT ALLOWS FOR INSTALLATION OF COMPUTER ACCESS FLOORS

ELECTRICAL:
+ HIGH EFFICIENCY LIGHTING SYSTEM
+ LOW BRIGHTNESS LIGHTING FIXTURES
+ DIESEL BACKUP GENERATORS TO PROVIDE ESSENTIAL SERVICE (3 LIFTS, 50% LIGHTING, 50% GENERAL POWER)

LIFTS:
+ 12 HIGH SPEED LIFT(S)
+ 3 CAR PARK LIFT(S)

HYDRAULICS:
+ MALE AND FEMALE TOILETS AT EACH LEVEL
+ KITCHENETTE AT EACH LEVEL

FEES AND PERSONAL INCENTIVES:
+ 14% OF THE AVERAGE ANNUAL GROSS RENTAL

FIG. 14B

287 {
- Sydney Australia ← 404
- Sydney
- sydny000.gar
- m m²
- $/ m² pa
- $ pa

285

4
North
South
East
West
24

291 {
- Anti static carpet
- Premium quality carpet tiles
- Breakout panels enabling internal staircases
- Compactus/high loading floor areas
- Large loading dock
- Loading facilities available
- Mechanically vented car park
- Carbon dioxide protection system in car park
- Telelift document distribution system
- Ground floor showers
- Ground floor lockers
- Ground floor bike racks
- Disabled access and toilets
- Double glazed high performance reflective glass
- Column free floors
- Good natural light
- Open air balconies on some floors
- Floor to ceiling glass
- Low glare high performance reflective glass
- Touch screen tenant information board
- Building automation system featuring direct digital control
- Automatic dialing systems
- Background music for public areas
- Provision for executive washrooms; bar facilities and kitchens
- 13
- Convention facilities available for tenant use
- Open air garden terrace for tenant use
- Underground retail connections
- Close to the Courts
- Rooftop entertainment area available for tenant use
- Swimming pool available for tenant use
- Naming and signage available
- On site management office
- Undercover access to the building
- 24 hour a day tenant service centre available to deal with tenant concerns
- Nearby hotel facilities
- Nearby fitness center
- Good access to public transport

20
24 hours; 7 day operation of any part thereof is available
Digital control system
After hours key control
Chilled water from central plant
Variable volume air conditioning
Condenser water system for supplementary air conditioning requirements
Dedicated fresh air riser
Kitchen exhaust provision
Perimeter air conditioning
Zoned air conditioning
After hours dial up air conditioning available
Floor by floor variable air conditioning system
A separate condensed water reticulation loop is provided to serve supplementary plant requirements (computer and conference rooms, trading areas)
Central chilled water plant with air handling plant on each floor
Whole building air conditioning
Ability to create additional zones with provision for special environments
Floor by floor operation provided by individual floor mounted fan coil units
Fully programmable after hours operation
Outside air economy cycle for low cost operation
Duct heating elements 5
Fully automatic sprinkler system
Stairwell pressurisation
Emergency warning and intercommunication system
Fire control room
Early warning smoke detection system 14
24 hours a day manned security operations room
Card key access control after hours
Proximity readers can be provided
Closed circuit TV monitoring of selected public and private areas
Card key system is expandable to meet individual requirements
Concierge
DKS security and management system
Microprocessor based key card access system
After hours access computer printouts available
Direct dialing systems
Programmable lift operation for individual floor security
Intruder alarms in place
Computerized access control system
24 hour access to building and car park by DKS security key 14
Dedicated data/communications riser
Ducted skirting floor to ceiling access at columns
Master antenna television system in place
Provision for satellite dish or microwave facilities
Telecom standard block cabling system
2700mm ceiling height allows for installation of computer access floors
A data cabling riser is available to all office levels

FIG. 18B

291 {
Access flooring in place
Central PABX
Satellite dish
Fiber Optic cabling
High speed internet access
Block cabling system in place to allow telephone line upgrades
Infrared capacity to cater for cordless telephone installation
9
High efficiency lighting tubes
Emergency lighting system
Recessed fluorescent lighting
Low brightness lighting fixtures
Triple channel ducted perimeter skirting to walls and columns
Independent dedicated substation
Additional heat load provision via a condenser water loop
Automatic standby power to essential services
Emergency power generation sized to allow building occupation during power failure
3
Goods lift available
Card key readers for after hours security
Car park lift access
7
Male and female toilets at each level
Kitchenette at each level
Facilitites for ensuites; bars and commercial ktchens on a typical floor
Installation of additional private facilities is possible
Tea room includes boiling water unit and a chilled water drinking system
Dishwasher
Refrigerator
1
Personal incentives available 293 {
2
19970625
5
changed 1 Macquarie Place; Sydney    Direct    16    02    320    540
1
4

FIG. 18C

295 {
14,1032
GATEWAY
1 MACQUARIE PLACE; SYDNEY

SITUATED AT CIRCULAR QUAY; OPPOSITE TRAIN; BUS AND FERRY SERVICES
AND OVERLOOKING SYDNEY HARBOUR. GATEWAY IS ONE OF SYDNEY'S
PREMIER LANDMARK TOWERS OVERLOOKING SYDNEY HARBOUR. COMPLETED
IN 1990 IT OFFERS THE LATEST IN SERVICES AND TECHNOLOGY. GATEWAY IS
A HOME TO NATIONAL AND INTERNATIONAL ORGANIZATIONS. THE BUILDING
IS SERVED BY THREE RISES WITH LOW RISE FLOORS OF APPROX 1,150 SQ M
AND HIGH RISE FLOORS OF APPROX 1,242 SQ. M STILL AVAILABLE. INCLUDED
IN THE RANGE OF SERVICES ARE BASEMENT SHOWER FACILITIES FOR STAFF.
GATEWAY,
0,0,0,30000,-1
0,0,0,0,0,
0
0
2093727
0

$$295 \begin{cases} 20 \\ 0 \\ \\ 0 \\ 0 \\ 31 \\ 2339 \\ 41 \\ \\ 11 \\ 0 \\ \\ 0 \\ 0 \\ 3050050 \\ 0 \\ 12 \\ \\ 3 \\ 0 \\ 3 \\ 0 \\ 0 \\ 140 \\ \\ \\ 0 \\ \\ \\ 0 \end{cases}$$

FIG. 18D

$$297 \begin{cases} 1 \\ 14 \\ 16 \\ 02 \\ 32000 \\ 32000 \\ 54000 \\ 12500 \\ \\ \text{PARTITIONED} \\ \text{GATEWFP1} \end{cases}$$

PARTITIONED
GATEWFP2

3
1
14
24
00
50000
50000
56000
12500

PARTITIONED
GATEWFP3

4
1
14
37

00
124300
124300
59000
1200

PARTITIONED
GATEWFP1

12345678

FIG. 18F

WEB-UPDATED DATABASE WITH RECORD DISTRIBUTION BY EMAIL

BACKGROUND OF THE INVENTION

This invention relates to database systems having provisions for receiving user input to update records, using the world wide web and provisions for distributing database record information using a mail transfer protocol.

Many businesses recognize that the Internet represents an unprecedented global distribution network. Serious real time limitations associated with the Internet make it difficult for them to perceive how this extraordinary network can be utilized for this purpose.

The deficiencies of the Internet, particularly its lack of dependability, the time lag associated with bandwidth limitations that further limit its use in the distribution of data intensive files, and its inability to display, on demand, data accompanied by picture quality graphics, has, in consequence, severely inhibited its commercial use.

The world wide web has provided the capability of providing database information to a plurality of users. Typically however, such information is presented to users through a web session in which users effectively log onto a database server and view database record information while logged onto the database server. This may require the transfer of relatively large files to a user's browser, which consumes a relatively large amount of time. Such usage of time may be frustrating especially if the user is attempting to provide information from the database to a customer or client, while the customer or client is waiting.

In addition, when information in a record is changed, it is sometimes necessary to advise certain users that a change has been made to ensure they are kept up to date. With a log-on type of system, user's are not notified of changes to information records. It is only when they log onto the system that they will be notified of changes to a record.

With a push type of system, where messages are automatically sent using a hypertext transfer protocol (HTTP), such messages are only available at the time they are sent and they are lost after a critical period of time. This results in the loss of such messages by a user who may be away from his system when such messages are sent.

The present invention addresses the need for immediate access to database records and the need to notify users of changes to database records.

BRIEF SUMMARY OF THE INVENTION

The present invention addresses current problems with Internet databases by creating a hybrid system that combines the advantages of Internet technology with the dependability and functionality of off-line computer based software applications.

Generally, the invention is applicable wherever a dynamic database is to be disseminated down to a regular user group, on a frequent basis.

In accordance with one aspect of the invention, there is provided a remotely updatable database system including a user interface, a database of information records, a database manager, and a message server. The user interface is for communicating with at least one subscriber system to receive user input from a user at the at least one subscriber system. The database manager is in communication with the user interface, for controlling the database such that each information record is associated with at least one user, and for amending the information records in response to user input received at the user interface from the at least one subscriber system. The message server is in communication with the database manager for serving a message including at least one record received from the database manager to the at least one user associated with the information record.

The information records may have respective pluralities of fields and preferably, the database may include a plurality of user records, each of the information records being linked to at least one user record.

The message server may include a processor and memory for storing program codes readable by the processor to direct the processor to communicate with the database manager to obtain for inclusion in the message a plurality of information records having at least one common field entry. In addition, the program codes readable by the processor may direct the processor to communicate with the database manager to obtain for inclusion in the message at least one information record having at least one common field entry.

The database manager may store the contents of at least some of the information records in a compressed format. The contents of at least one field of the information record may include at least one information code and the at least one information code may represent at least one of a plurality of predefined contents of the field.

The apparatus may include memory for storing a key identifying the predefined contents of each of the fields represented by the at least one information code.

The at least one information code may represent a quantitative measure of a predefined physical quantity and the apparatus may include memory for storing a key identifying the predefined physical quantity. The key may include a character string associated with the field.

The at least one information code may identify whether or not any of a plurality of pieces of information are to be associated with the record and the at least one information code includes a decimal number representing a binary number having individual bits representing the inclusion or exclusion of a corresponding predefined piece of information. Preferably, there is a key identifying the plurality of pieces of information, the key including a plurality of character strings associated with the field.

The server memory may include program codes for directing the server processor to produce a composite file including the key and at least one of the information records and for directing the server processor to produce a compressed file including the key and at least one of the information records.

The compressed file may include an image file and the message includes the compressed file and preferably, the user records include a user address field for storing a user address to which a message produced by the message server is to be transmitted.

The memory may include program codes for directing the processor to direct the database manager to scan the user records to obtain a distribution list of user records having the contents of at least one field associated with the contents of a predesignated field in at least one of the information records and preferably, the server memory includes program codes for directing the server processor to transmit the compressed file to each of the user addresses identified in the user address fields of the user records on the distribution list.

The user interface may include a web interface.

In accordance with another aspect of the invention, there is provided a method of maintaining and distributing database information. The method involves:

communicating with at least one subscriber system to receive user input from a user at the at least one subscriber system;

maintaining a database of information records;

controlling the database such that each information record is associated with at least one user, amending the information records in response to user input from the at least one subscriber system; and serving a message including at least one information record from the database to the at least one user associated with the information record.

The method may involve the step of maintaining user records in the database and linking the user records with information records and obtaining for inclusion in the message a plurality of information records having at least one common field entry.

The method may involve the step of storing the contents of at least some of the information records in a compressed format and storing at least one information code in at least one field in at least one information record.

The method may involve representing at least one of a plurality of predefined contents of the field and storing a key identifying the predefined contents of each of the fields represented by the at least one information code.

The method may involve representing a quantitative measure of a predefined physical quantity and storing a key identifying the predefined physical quantity.

The method may involve including within the key a character string associated with the field and identifying whether or not any of a plurality of pieces of information are to be associated with the record.

The method may involve storing a decimal number as the information code, the decimal number representing a binary number having individual bits representing the inclusion or exclusion of a corresponding predefined piece of information. Preferably, the method also includes the step of identifying the plurality of pieces of information in a key and including within the key, a plurality of character strings associated with the field.

The method may involve directing the server processor to produce a composite file including the key and at least one of the information records.

The method may involve directing the server processor to produce a compressed file including the key and at least one of the information records.

The method may involve including an image file within the compressed file and including the compressed file in the message.

The method may involve including within the user records a user address field for storing a user address to which a message produced by the message server is to be transmitted.

The method may involve scanning the user records to obtain a distribution list of user records having the contents of at least one field associated with the contents of a predesignated field in at least one of the information records and transmitting the compressed file to each of the user addresses identified in the user address fields of the user records on the distribution list.

In accordance with another aspect of the invention, there is provided a computer-readable storage medium on which is stored codes operable to direct a computer to maintain and distribute database information, by directing the computer to:

communicate with at least one subscriber system to receive user input from a user at the at least one subscriber system;

maintain a database of information records;

control the database such that each information record is associated with at least one user, amend the information records in response to user input from the at least one subscriber system; and serve a message including at least one information record from the database to the at least one user associated with the information record.

In accordance with another aspect of the invention, there is provided an apparatus for receiving database record information from a database containing a plurality of database records. The apparatus includes a message receiver, transfer memory, an output device, a processor circuit and processor memory. The message receiver receives a message from the database, the message including at least one file from the database. The transfer memory stores the at least one file. The output device presents information to a user. The processor circuit is in communication with the message receiver, the transfer memory and the output device. The processor memory is programmed with processor-readable codes for directing the processor to direct the output device to present to the user a list of files stored in the local memory, the files included in the list having at least one predefined characteristic; and to direct the output device to present to the user at least some of the contents of at least one file having the at least one predefined characteristic.

The message receiver may include a receiver for receiving messages according to the simple mail transfer protocol and preferably, the message receiver receives the least one file in an Email message.

The processor memory may include processor readable codes for directing the processor circuit to replace existing files in the transfer memory with new files received from the database and for directing the processor circuit to identify each file received from the database.

The processor memory may include processor readable codes for directing the processor circuit to read a pre-defined portion of the at least one file to identify the pre-defined characteristic and for directing the processor circuit to present to a user a list of the predefined characteristics associated with the at least one file.

The processor memory may include processor readable codes for directing the processor circuit to transfer to working memory at least one file identified by a user and for directing the processor circuit to reconstruct records from the at least one file.

The processor memory may include processor readable codes for directing the processor circuit to display the contents of at least some fields of the records.

The processor memory may include processor readable codes for directing the processor circuit to locate at least one key in the at least one file and apply the contents of at least one field of least one record to the at least one key to produce a representation of encoded information stored in the at least one field and for directing the processor circuit to display at least one character string contained in the key, the character string being identified by the contents of a corresponding field in the record.

The processor memory may include processor readable codes for directing the processor circuit to tag at least one of the records in response to user input and for directing the processor circuit to display the contents of at least some fields of the tagged records.

In accordance with another aspect of the invention, there is provided a method of presenting database record information from a database containing a plurality of database records. The method involves:

receiving a message including at least one file from the database;

storing the at least one file in a transfer memory;

presenting to a user a list of files stored in the transfer memory, the files included in the list having at least one predefined characteristic; and presenting to the user the contents of at least one file having the at least one characteristic.

The method may involve receiving the at least one file in an Email message.

The method may involve replacing existing files in the transfer memory with new files received from the database and identifying each file received from the database.

The method may involve reading a pre-defined portion of the at least one file to identify the pre-defined characteristic and presenting to a user a list of the predefined characteristics associated with the at least one file.

The method may involve transferring to working memory at least one file identified by a user and reconstructing records from the at least one file.

The method may involve displaying the contents of at least some fields of the records.

The method may involve locating at least one key in the at least one file and applying the contents of at least one field of least one record to the at least one key to produce a representation of encoded information stored in the at least one field.

The method may involve displaying at least one character string contained in the key, the character string being identified by the contents of a corresponding field in the record.

The method may involve tagging at least one of the records in response to user input and displaying the contents of at least some fields of the tagged records.

In accordance with another aspect of the invention, there is provided a computer-readable storage medium on which is stored codes operable to direct a computer to present database record information from a database containing a plurality of database records, by directing the computer to:

receive a message including at least one file from the database;

store the at least one file in a transfer memory;

present to a user a list of files stored in the transfer memory, the files included in the list having at least one predefined characteristic; and present to the user the contents of at least one file having the at least one characteristic.

In accordance with another aspect of the invention, there is provided a remotely updatable database system including a central server and at least one subscriber system. The central server includes a user interface for communicating with the at least one subscriber system to receive user input from a user at the at least one subscriber system, a database of information records, a database manager in communication with the user interface, for controlling the database such that each information record is associated with at least one user, and for amending the information records in response to user input received at the user interface from the at least one subscriber system and a message server in communication with the database manager for serving a message including at least one record received from the database manager to the at least one user associated with the information record. The subscriber system includes a message receiver for receiving a message from the message server, the message including at least one file from the database, transfer memory for storing the at least one file, an output device for presenting information to a user and a processor circuit in communication with the message receiver, the transfer memory and the output device, and processor memory programmed with processor-readable codes for directing the processor to direct the output device to present to the user a list of files stored in the local memory, the files included in the list having at least one predefined characteristic; and to direct the output device to present to the user at least some of the contents of at least one file having the at least one predefined characteristic.

In accordance with another aspect of the invention, there is provided a method of maintaining and distributing database information. The method involves:

communicating with at least one subscriber system to receive user input from a user at the at least one subscriber system;

maintaining a database of information records;

controlling the database such that each information record is associated with at least one user;

amending the information records in response to user input from the at least one subscriber system;

serving a message including at least one information record from the database to the at least one user associated with the information record;

receiving the message at least one subscriber system;

storing the at least one file in a transfer memory;

presenting to a user a list of files stored in the transfer memory, the files included in the list having at least one predefined characteristic; and presenting to the user the contents of at least one file having the at least one characteristic.

By receiving database information during a web session, a record can be easily and quickly updated at the server. After such updating, the record can be immediately transferred to users subscribing to the system, using the simple mail transfer protocol, such that users which must be advised immediately of changes to particular records are so advised, by receiving new records. In addition, the simple mail transfer protocol allows the database system to know if a transmission failed and whether a message has been downloaded. If a message has not been downloaded, the database system can send the message. In addition, the use of the simple mail transfer protocol allows the database system to send a message containing any type of file, such as a multimedia file, for example.

In addition, the use of the simple mail transfer protocol allows users to receive and accumulate messages at a predefined message server and to retrieve such messages at any time or at their discretion. Consequently, messages are not lost. In addition, this allows a user to selectively review messages received over a period of time.

More particularly, the use of the simple mail transfer protocol gives the database system the ability to target all users or as few as a single user, each with a unique message. Also, as opposed to a push system, the database system disclosed herein has the ability to target and send an individual messages that he has made himself available to receive but has not specifically requested. Furthermore, by keeping copies of records of interest to a user at the user's system, the user has instant access to database records. The use of the simple mail transfer protocol to transmit files containing new records to users allows user systems to be kept up-to-date and allows the user to be informed of any changes to database information.

The compression aspects of the invention drastically reduce the size of data files transferred to users and, hence, reduce the transfer time required to send messages to users.

For example, with fifteen buildings, each with seven to ten pages of related information and each page being represented by fifteen kilobytes when stored as a text file, a file size of approximately 2250 kilobytes is created. A message containing such file can be downloaded to a user with the system described herein using a standard 28.8 kilobit/second modem in less than four seconds as opposed to the approximately twenty-five minutes it would take with current systems using a similar communications channel.

BRIEF DESCRIPTION OF THE SEVERAL VIEWS OF THE DRAWING

In drawings which illustrate embodiments of the invention,

FIG. 3 is a representation of a user record according to the first embodiment of the invention;

FIG. 4 is a representation of an access record according to the first embodiment of the invention;

FIG. 5 is a representation of a region record according to the first embodiment of the invention;

FIG. 6A is a representation of a first portion of a building record according to the first embodiment of the invention;

FIG. 6B is a representation of a second portion of a building record according to the first embodiment of the invention;

FIG. 7A is a representation of a first portion of string key according to the first embodiment of the invention;

FIG. 7B is a representation of a second portion of string key according to the first embodiment of the invention;

FIGS. 8A, 8B, 8C, 8D, 8E, 8F, 8G, 8H, 8I and 8J are representations of a category key according to the first embodiment of the invention;

FIGS. 9A, 9B, 9C, 9D, 9E, 9F, 9G, 9H, 9I and 9J are representations of a general data key according to the first embodiment of the invention;

FIG. 10 is a representation of a unit record according to the first embodiment of the invention;

FIG. 12 is a pictorial representation of an overview HTML file as seen at a browser at a subscriber system, according to the first embodiment of the invention;

FIG. 14A is a pictorial representation of a first portion of an agent's notes HTML file as seen on at a browser at a subscriber system, according to the first embodiment of the invention;

FIG. 14B is a pictorial representation of a second portion of an agent's notes HTML file as seen on at a browser at a subscriber system, according to the first embodiment of the invention;

FIGS. 18A, 18B, 18C, 18D and 18E together form a representation of a "gar" file produced by the exclusive mail routine shown in FIG. 17;

FIG. 18F illustrates a seventh portion of a global gar file;

DETAILED DESCRIPTION OF THE INVENTION

FIG. 1

Figure 1:
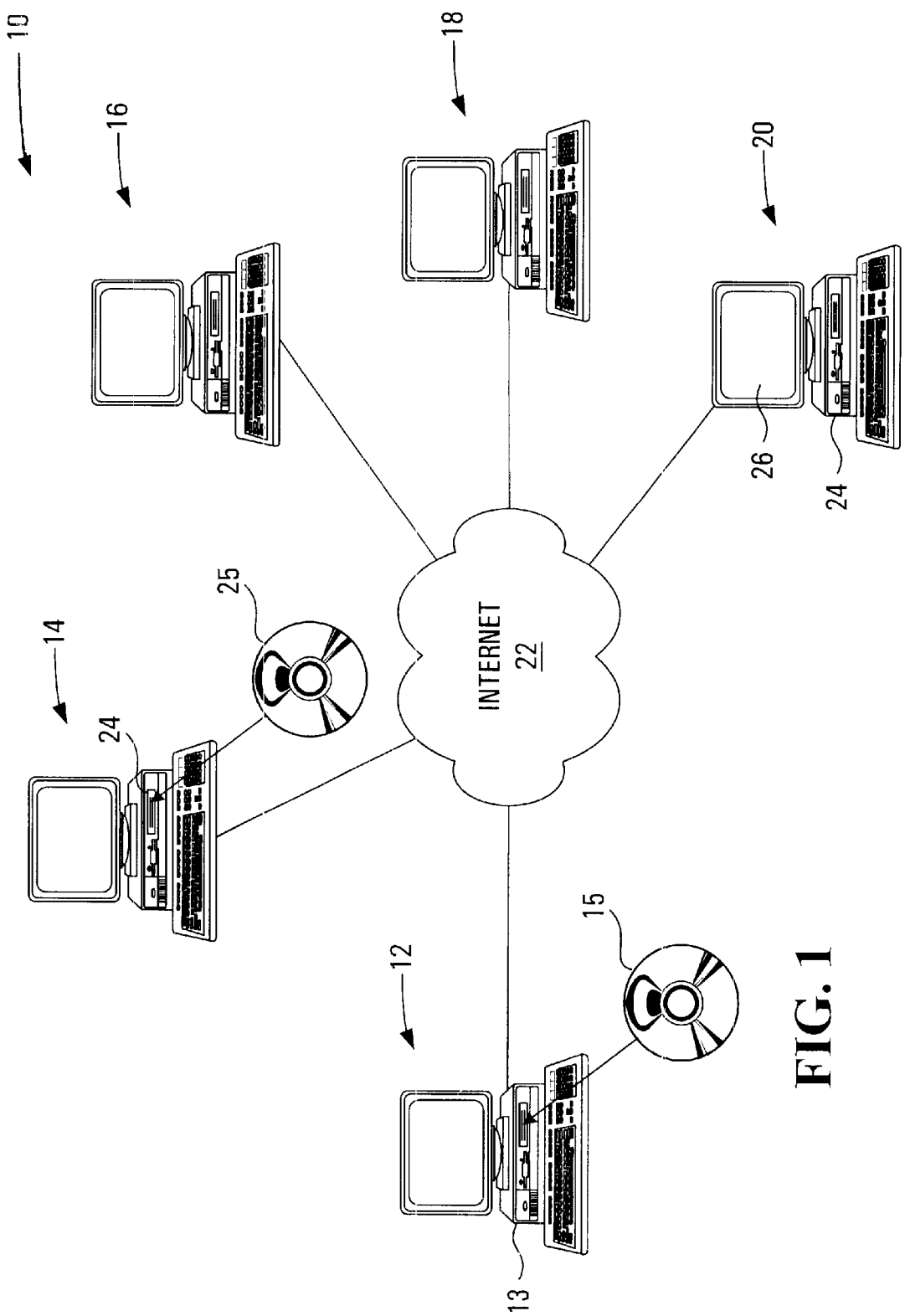
FIG. 1 is a schematic diagram of a database system according to a first embodiment of the invention.

Referring to FIG. 1, a web-updatable database system according to a first embodiment of the invention is shown generally at 10. The system includes a database system 12 and a plurality of subscriber systems 14, 16, 18 and 20 operable by subscribers (users) of the system to communicate with the database server via an internet 22. In this embodiment, the system 10 is used to provide real estate agents access to real estate information which they enter and which is accumulated, for a particular geographical region, for use by selected agents.

Generally, subscribing users (real estate agents) use the subscriber systems 14–20 to initiate a web session to communicate with the database system 12 to produce and update or amend building information records stored at the database system 12 and the database system 12 transmits messages including database records to selected subscriber systems, using the Simple Mail Transfer Protocol (SMTP). In general, the building record fields are used to store information relating to certain physical aspects or features of the building itself. Each building information record relates to a respective building. In general, the database system includes a computer 13 on which is installed an application from a computer readable storage medium 15 on which is stored codes operable to direct a computer to maintain and distribute database information, by directing the computer to:

a) communicate with at least one subscriber system to receive user input from a user at the at least one subscriber system;

b) maintain a database of information records;

c) control the database such that each information record is associated with at least one user, d) amend the information records in response to user input from the at least one subscriber system; and e) serve a message including at least one information record from the database to the at least one user associated with the information record.

Each subscriber system 14–20 includes a computer 24 on which is installed an application 26 from a computer readable storage medium 25 on which is stored codes operable to direct the computer to present database record information from the database by directing the computer to:
- a) receive a message including at least one file from the database;
- b) store the at least one file in a transfer memory;
- c) present to a user a list of files stored in the transfer memory, the files included in the list having at least one predefined characteristic; and
- d) present to the user the contents of at least one file having the at least one characteristic.

which automatically downloads SMTP messages. Also installed on the computer 24 is browser for facilitating a web session between the subscriber system and the database system 12.

FIG. 2

Figure 2:
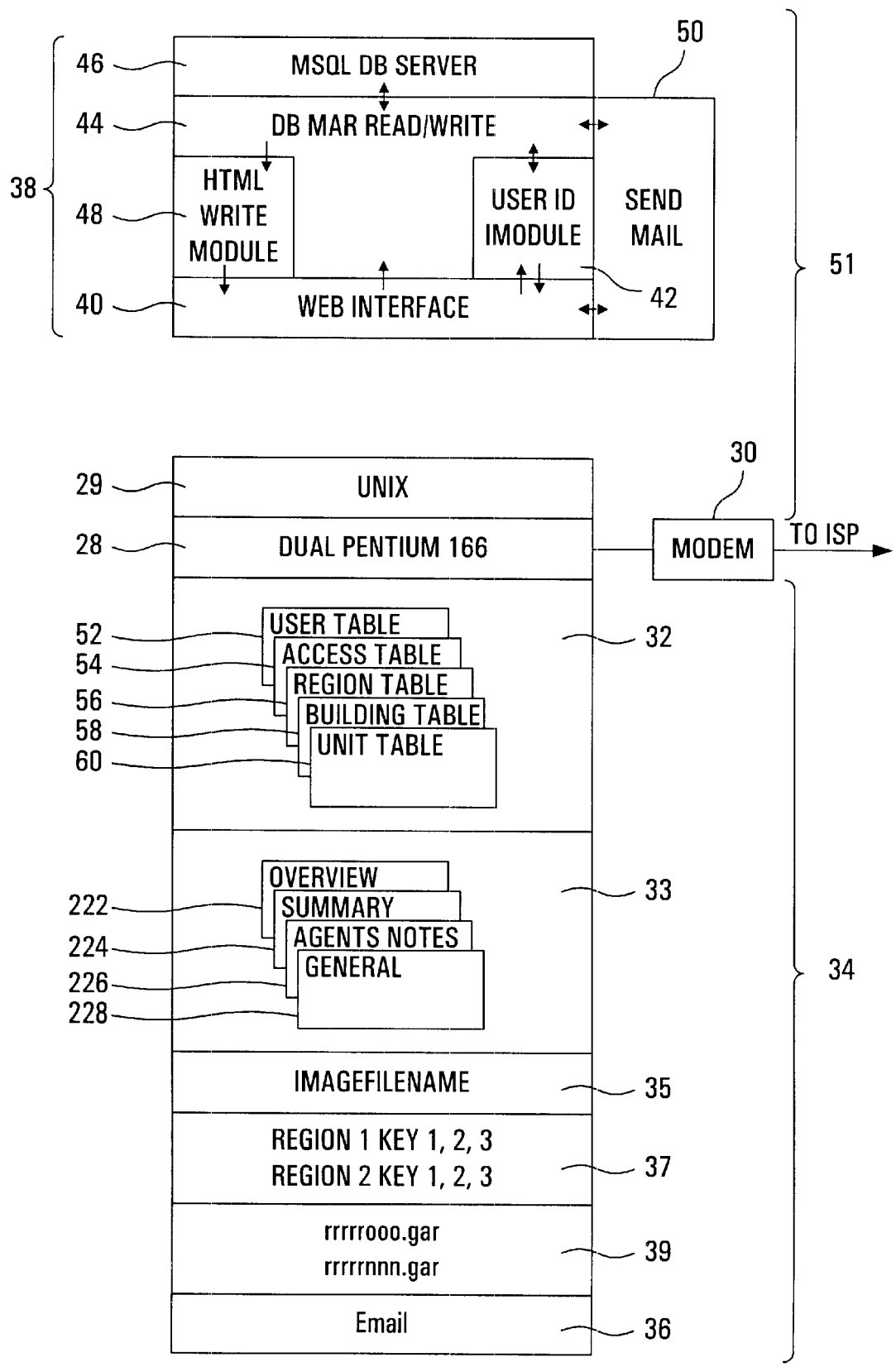
FIG. 2 is a schematic diagram of a database system computer architecture according to the first embodiment of the invention.

Referring to FIG. 2, the database system 12 includes a system processor circuit 28, which in this embodiment includes a computer including dual Pentium (R) 166 Mhz processors running a Linux ver. 2.0.32 Unix Operating System 29. The processor circuit 28 is connected to a communications interface 30, which facilitates communications to an internet services provider (not shown). The processor circuit 28 further includes disk memory 34, including a database area 32, a template area 33, an image file area 35, a region key area 37, a gar file area 39, and a mail area 36. The database area 32 stores a plurality of database records in respective tables. The template area stores a plurality of HTML templates. The image file area 35 stores a plurality of image files. The region key area 37 stores string keys, and keys for interpreting database record field contents and the gar file area 39 stores files for distribution to subscriber systems. The mail area 36 stores files ready to be dispatched to subscriber systems.

Running on the UNIX operating system 29 is applications software 38 including a web interface 40, a user id module 42, a database manager 44 a MSQL database server 46, an HTML module 48 and a send mail module 50, all stored in system memory 51.

Web Interface

The web interface 40 includes Apache (R) world wide web (WWW) server software, version 1.2.5. which receives access request messages, from users via the internet services provider and which provides hypertext markup language files to users via the internet services provider.

User ID Module

The user id module 42 cooperates with the web interface 40 to access the MSQL database server 46 to verify user id codes and passwords received by the web interface 40 from the internet services provider, before database record read/write access is allowed.

Database Manager Read/Write Module

The database manager 44 is in communication with the web interface 40 and reads and writes to fields in individual records within the database memory in response to requests made from the user id module 42 and the web interface 40.

Database Server Module

The database manager 44 is written in PERL ver. 5.003 and organizes the database area 32 to include a user table 52, an access table 54, a region table 56, a building table 58 and a unit table 60, each having respective records, with respective fields, which are written to or read from by the database manager 44.

HTML Module

The HTML module 48 receives the contents of fields as provided by the database manager 44 and merges the contents of the fields with predefined display templates pre- stored in the disk memory 34, to produce HTML page files. An HTML page file holds record information in a format predefined by the applied template. HTML page files are provided directly to the web interface 40 for transmission to the internet services provider and ultimately to a subscriber system (14–20), using the hypertext transfer protocol (HTTP).

Send Mail Module

The send mail module 50 cooperates with the database manager 44 to obtain the field contents of selected records from the database area 32 and transmits files to subscriber systems using the Simple Mail Transfer Protocol (SMTP).

FIG. 3

User Records

Referring to FIG. 3, the user table includes a user record as shown generally at 62. A user record includes a username field 64, for storing the name of a user, an Email address field 66, for storing an Email address of the user, a password field 68 for storing a user password for gaining access to the database, a building owner field 70 for storing a building owner code, if such user is a building owner, and an approved field 72 for storing a code to indicate whether the user has global or exclusive rights to information linked to the user record. The Email address field 66 acts as a user address field for storing a user address to which a message produced by the message server is to be transmitted.

FIG. 4

Access Record

Referring to FIGS. 2 and 4, the access table includes access records as shown generally at 74. Access records include a plurality of fields including a building id field 76, a username field 78 and a building owner field 80 for defining access rights to the record. A plurality of access records may be linked to a user record by the username field 78.

FIG. 5

Region Record

Referring to FIGS. 2 and 5, the region table includes region records as shown generally at 82. A region record includes a plurality of fields including a region id field 84 and other fields for storing information relating to the geographical location and legal aspects of the building, such as region name and zoning pertaining to a region.

FIGS. 6A and 6B

Building Record

Referring to FIGS. 2, 6A and 6B, the building table includes building records as shown generally at 90. Building records include first, second and third pluralities of fields 92, 94 and 96.

The first plurality 92 includes a username field 98, a region id field 100, a building id field 102, a building code field 104, name field 106, address field 108, zone field 110, location field 112, description field 114, imagefilename field 116, and unitimagefilena field 118 for storing integer or character values representing associated information.

Referring to FIG. 6A, the image filename field 116 is used to store the name of an image file stored in the image file area 35 of the disk memory 34, showing a perspective view of the building and its surroundings. Such an image file is entered into the image file area 35 by the system operator at the time a building is listed on the system. Similarly, the name of an image file of an image of a unit within the building is stored in the unitimagefilena field 118 and the image file is stored in the image file area 35 of the disk memory 34.

FIGS. 7A and 7B

The second plurality of fields 94 includes a leasetype field 120, a leaseterm field 122, a lease option field 124, a rentreview field 126, an availability field 128, an outgoings date field 130, an outgoings field 132, a cleaning field 134, a parking field 136, an access field 138, a legal costs field 140, and a signage field 142. Each of these fields is used to store respective integer values which act as information codes representing predefined character strings as shown in FIGS. 7A and 7B. Such predefined character strings are stored in the disk memory 34 as string keys which act as keys for identifying the possible predefined contents of each of the fields represented by the information codes. Different string keys may be associated with different regions and, therefore, the string key applicable to a given building record is defined by the contents of the region id field 100 of the record 90. The use of information codes eliminates the need to store entire statement strings with each record or each file, but rather, requires only the storage of an integer representing a string. The string need only be stored once as the key. This reduces memory storage requirements, effectively "compressing" the information associated with each record.

FIGS. 9A and 9B

The third plurality of fields 96 includes category fields 144, 146, 148, 150, 152, 154, 156, 158, 160 and 162 for storing integer values representing respective groups of predefined comments and includes pluralities 164, 166, 168, 170, 172, 174 and 176 of general data fields for storing data for use in predefined statements which provide quantitative information about predefined aspects of the building. Such predefined statements applicable to each plurality of general data fields are shown in FIGS. 9A through 9J, respectively.

FIGS. 8A through 8J

Category Fields

Referring to FIGS. 6A and 8A, the category fields 144, 146, 148, 150, 152, 154, 156, 158, 160 and 162 are used to store a decimal representation 163 of a binary number 165 in which individual bits of the binary number are set to 0 or 1, depending upon whether or not corresponding predefined information statements are to be included in the category. For example, as shown in FIG. 8A, the statements with a "1" beside them are to be included in a structural flag category of statements which will ultimately appear in a format readable by the user, while the statements with a "0" beside them will not. For example, the statement "Anti static carpet" is intended to be associated with the record, while the statement "loading facilities available" is not. Thus "Anti static carpet" has a 1 beside it while "loading facilities available" does not. The individual bits representing each statement are considered to form a binary number, in which the inclusion of the first statement "Anti static carpet" is represented by the least significant bit of the binary number and the inclusion of the last statement "Provision for executive washrooms . . . " is represented by the most significant bit of the number. Thus, in the example shown, the binary number 165 is represented in Hexadecimal format as 1FF2AF, which, when converted into a decimal format, forms the decimal number 2093727, and this decimal number is stored in the category field entitled structuralflags 144 in FIG. 6A. Effectively, the decimal number also acts as an information code identifying whether or not any of a plurality of pieces of information are to be associated with the record. More particularly, the decimal number represents a binary number having individual bits representing the inclusion or exclusion of a corresponding predefined piece of information.

Lists of available statements associated with the general flags, AircondFlags, Firesafetyflags, Securityflags, Commflags, Electricalflags, Lifts, Hydraulics and Incentive flags are shown in FIGS. 8B-8J respectively. The use of a single decimal number to represent a plurality of applicable statements to be associated with the field eliminates the need to repeatedly store each statement as a string, thereby, effectively, reducing the amount of storage space required as the key need only be stored once and only the codes applicable to the keys need be stored for each record. This effectively "compresses" the building record.

In this embodiment, each region has a different set of statements, as each region may have a different set of criteria important to agents. For example, the criteria desired by an Australian agent may differ from that of an American agent. Thus, the statements applicable to a building are identified by the region in which the building is situated. Such statements for a given region are stored only once in the region key area 37 of disk memory 34 and codes, i.e. the decimal values described above, unique to the building, are stored in the category fields of the associated building record. When addressing a particular category field, the contents of the region id field of the same record are used to identify the appropriate key from FIGS. 8A–8J to encode and decode the category field contents. Hence, the key identifies a plurality of pieces of information which include a plurality of character strings associated with respective fields. This significantly reduces the amount of storage space required to store a large number of building records as the common wording in the predefined statements need not be stored with each building record.

General Data Fields

Referring back to FIGS. 6A and 6B, the general data fields in pluralities 164, 166, 168, 170, 172, 174 and 176 store data for use in predefined statements to provide quantitative information about predefined aspects of the building. Referring to FIGS. 9A–9J, the predefined statements associated with each category are shown. The statements shown in FIGS. 9A–9J are stored as a general data key in the region key area 37 and are associated with the region identified by the contents of the region id field number and relate to the general data fields in pluralities 164, 166, 168, 170, 172, 174 and 176, respectively. The system thus includes memory for storing a key identifying a predefined physical quantity.

Each statement has a variable field for providing a quantitative measure of a predefined physical quantity or certain aspect of the building. The contents of each variable field are stored in building record fields corresponding to the indicated statement. FIGS. 9A-9J relate building record fields to respective statements. Thus, the key includes character strings associated with respective fields. For example, if the typical floor size of the building is 1243 square metres and the total number of floor levels is 46, the field entitled floorsize 190, in the building record shown in FIG. 6A, is loaded with the value 1243 and a field entitled levels 192 in the same record is loaded with the value 46. When the user views the record, the contents of the general data fields are inserted into the corresponding predefined statements 194 and 196 in FIG. 9B and presented to the user, to provide context for the values stored in the general data fields. By storing only the variable associated with a particular statement and later associating that number with a statement in a predefined key, the statement need only be stored once in the key and the variable associated with the statement need only be stored in the related field of the building record. This eliminates the need to store a string associated with the statement in each building record. This reduces memory requirements, effectively compressing the representation of information about the building.

With the use of the integer values in the second plurality of fields, the use of the single decimal number in connection with the category fields and the storage of only the variable portions of statements in connection with the general data fields, the building record is effectively compressed. In effect therefore, the database manager stores the contents of at least some fields of the building information records in a compressed format.

Referring back to FIGS. 6A and 6B, a plurality of building records are linked to a single access record through the building id field 102 and a plurality of building records may be linked to a single region record by the contents of the region id field 100. As access records are linked to user records, each information record is thus associated with at least one user. As the database manager reads and writes to fields in the records, the database manager thus controls linking between records.

FIG. 10
Unit Table

Referring to FIG. 10, a unit record is shown generally at 200. The unit record 200 includes a plurality of fields including a unit id field 202, a building id field 204, a unit level id flag field 206, a level field 208, a suite field 210, a maximum area field 212, a minimum area field 214, a rental field 216, an UOutgoings field 217, a warehousing field 218, a remarks field 219, fields for floor plan and picture images 221, and a datestamp sent field 223 and a datestamp change field 225 for storing information relating to specific features of a particular unit of the building.

The floor plan and picture image fields 221 are used to store the names of image files stored in the image file area 35, depicting images of the floor plan of the corresponding suite and the view seen from the suite, respectively.

The datestamp sent field 223 is used to store a representation of a date on which the unit record was created in the system. The datestamp change filed is used to store a representation of a date on which the unit records was last changed in the system.

A plurality of unit tables may be associated with a single building record. Unit records are linked to building records by the building id field 204.

Thus, the database area of memory acts as a database for maintaining a plurality of information records.

Templates

Referring briefly to FIG. 2, the HTML module 48 pre-defines a set of templates 220 which are stored in the template area 33 of the disk memory 34 used in presenting data to a user. In this embodiment there are three main templates, including an overview template 222, a summary template 224, an agent's notes template 226, and a plurality of general templates 228.

FIG. 11

Figure 11:
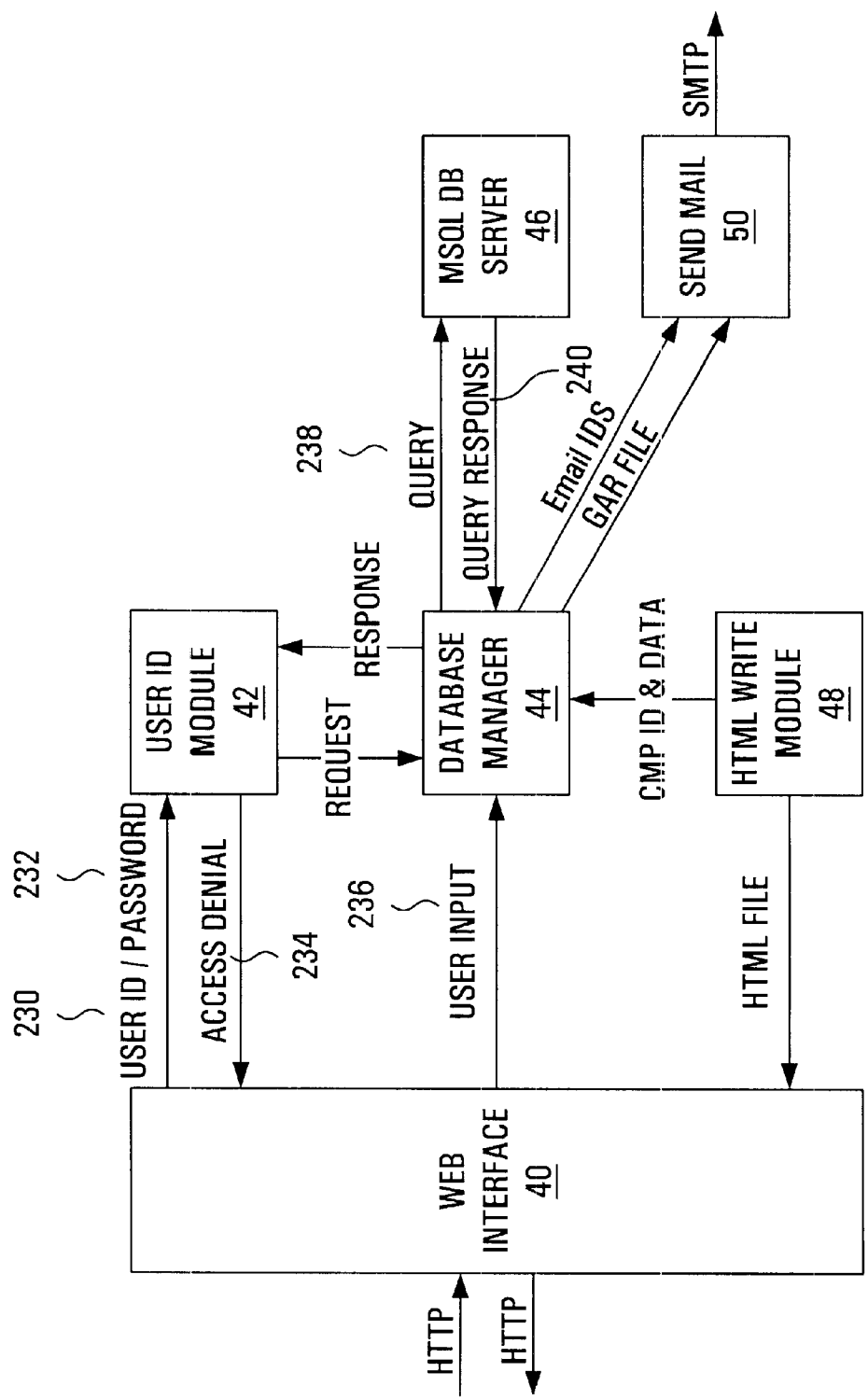
FIG. 11 is a schematic representation of the cooperation between various modules shown in FIG. 2.

Referring to FIG. 11, the operation of the modules shown in FIG. 2 is described. It will be assumed that a user record 62 as shown in FIG. 3, has already been prepared by a systems administrator, to identify the user as a subscriber to the system. The user corresponding to the user record 62 accesses the system by establishing a web session with the web interface, from a subscriber system via the internet.

To establish the web session, the browser at the user's station transmits to the user's internet provider a request to a universal resource locator identifying the system (12). The user's internet services provider establishes a connection with the web interface 40 using well-known web session procedures.

Once the web session has been established, the web interface 40 transmits to the user's browser, an HTML page using the hypertext transfer protocol (HTTP), requesting user input including a user id and password. The user id and password are sent from the user's browser to the web interface in the HTTP format and the web interface communicates the user id 230 and password 232 to the user id module 42.

The user id module 42 generates a request to the database manager 44 to produce a request to the MSQL database server 46 for a query of user records to search for a user record as shown in FIG. 3 having user field (64) contents and password field (68) contents identical to the user id 230 and password 232 received from the user's browser. If such a record is found, the contents of predefined fields of the user record are provided to the HTML module 48 which accesses the general template 228 in the template area 33 of disk memory 34 and merges the contents of the predefined fields of the record with that template to produce a general HTML file. This general HTML file is passed to the web interface 40, which transmits it to the user's browser.

If a user record having user id and password field contents equal to that initially provided by the user, is not located in the database area 32 the database manager provides a response to this effect to the user id module, which provides an access denial message 234 to the web interface 40, for transmission to the user's browser.

Assuming, the user id 230 and password 232 were found in the user records, the general HTML file sent to the user's browser provides a list of options for the user to supply input to access the contents of building records 90 shown in FIG. 6A.

List of Regions

If the user provides input indicating a desire to amend a building information record, a message is sent from the user's browser to the web interface 40, according to well known internet protocols. The web interface 40 directs the processor to access the database manager 44 to obtain a list of regions about which building information is available. The database manager 44 compiles such a list from the building information records located by the MSQL database server 46 and forwards such list to the HTML module 48 which merges the list with a predefined HTML template (not shown) to produce a regional HTML file. This regional HTML file is passed to the web interface 40 which transmits it to the user's browser. The predefined HTML template causes the user's browser to present the list to the user in a predefined graphical format which facilitates receipt of user-input specifying a particular region selected from the list, in which a building of interest is located.

List of Buildings

The user's browser receives user-input selecting a building of interest and request for an update and forwards a message to this effect back to the web interface 40. On receipt of such user-input, the web interface 40 transmits to the database manager 44 the user input 236 identifying the region of interest to the user. The database manager 44 then directs the MSQL database server 46 to access the database memory (32 in FIG. 2) to identify building information records of the type shown in FIG. 6A having region id field 100 contents matching the region selected by the user. A template id and the contents of the building name fields of such records are then passed to the HTML module 48 which produces a building list HTML file. This building list HTML file is passed to the web interface 40 which transmits it to the user's browser.

The building list HTML file causes the browser to present the list to the user in a predefined graphical format which facilitates receipt of user-input specifying a particular building selected from the list. The user then makes a selection whereupon the browser transmits to the web interface 40 a request to access the corresponding building record.

Building Overview

FIG. 12

The web interface 40 passes the request to the database manager 44, which sends a query 238 to the MSQL database server 46 and receives a query response 240. The database manager 44 then passes the contents of the name, address, zone, location, and description fields (106, 108, 110, 112 and 114 in FIG. 6A) and an overview template to the HTML module 48.

The HTML module 48 produces an overview HTML file, which is passed to the user's browser through the web interface 40. Referring to FIGS. 6A and 12, the user's browser produces a display image as shown generally at 250. The display image 250 displays the contents of the name field 106, the contents of the address field 108, the contents of the zone field 110, the contents of the location field 112 the contents of the description field 114 and an image derived from the contents of the imagefilename field 116.

Suite Summary

Referring to FIGS. 10 and 11, if the user desires to view a summary of suite details, the user selects an appropriate option on the browser which transmits a message to the web interface 40 which passes a message to the database manager 44 which retrieves the contents of the name 106, address 108, zone 110 and unitimagefilena 118 fields of the building record 90 and which retrieves the contents of the level 208, suite 210, area 212, rental 216, UOutgoings 217 and remarks 219 fields of the unit record 200 for direct merging with a summary template by the HTML module 48 to produce a summary HTML file for transmission to the user's browser.

Referring to FIGS. 6A and 11, the HTML module 48 also retrieves the contents of the leasetype 120, leaseterm field 122, lease option 124, rentreview 126, availability 128, outgoings 132, cleaning 134, parking 136, access 138 fields and applies each respective contents to a string key associated with the region identified by the contents of the region id field 100 to correlate codes stored in the indicated fields with predefined statements to be viewed by the user. The string key correlating stored codes with predefined statements is shown in FIGS. 7A and 7B with the building record field indicated in the left-hand column and codes for available predefined statements indicated in the right-hand column.

The statements specified by the codes stored in the building record fields, as defined by the key are included in the summary HTML file. The summary template also includes a calculation routine which multiplies the contents of the maximum area field 212 by the contents of the rental field 216 to produce a calculated rent value.

FIG. 13

Figure 13:
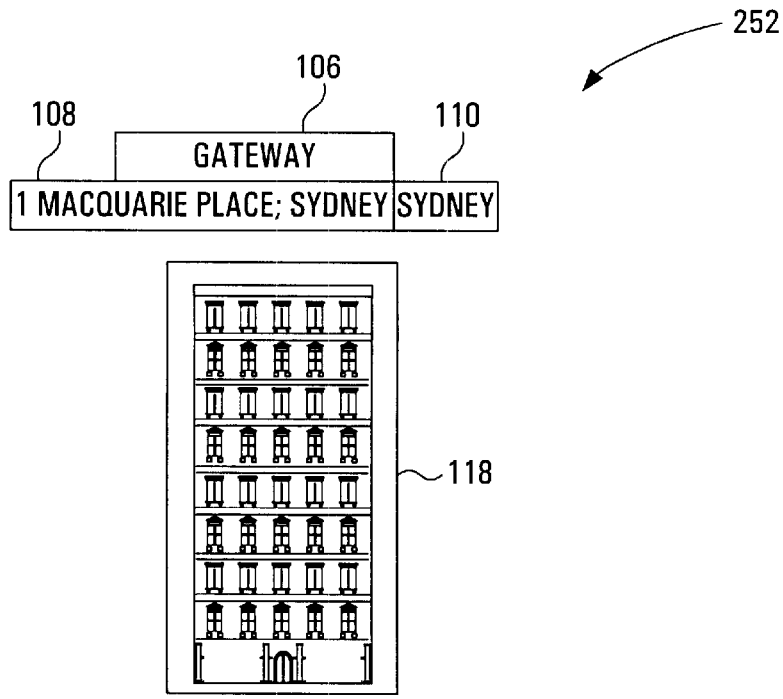
FIG. 13 is a pictorial representation of a summary HTML file as seen at a browser at a subscriber system, according to the first embodiment of the invention.

Referring to FIG. 13, the browser displays the HTML file as shown generally at 252 wherein the numerical reference numbers identify the fields of the building record shown in FIG. 6A from which the displayed values were obtained. The calculated rent value is indicated generally at 255.

If, during viewing of the suite summary display 252, the user wishes to change the leaseterm field 122 for example, the user simply uses his pointing device to point to the lease term on the display 252 produced by the user's browser and selects to amend the contents of the field. The browser transmits a message to this effect to the web interface 40, which provides the message to the database manager 44. The database manager locates the string key shown in FIG. 7A and locates the six lease term options available. Statements representing these options are forwarded to the HTML module 48, which re-sends the previous HTML page, with the various options displayed in a separate window located adjacent the lease term heading shown in FIG. 13. The user then selects the desired lease term option, which causes the user's browser to send a message, indicative of the desired option, to the web interface 40. The web interface 40 forwards the message to the database manager 44, which writes the appropriate number 0–5 representing the selection made. by the user, into the leaseterm field 122 of the building record 90 shown in FIG. 6A.

In general, any changes to the contents of the fields in the second plurality 94 as shown in FIGS. 6A and 6B, are made in a similar manner.

Agent's Notes

The user may then request to see the agent's notes associated with the building record, in which case a message is sent from the user's browser to the web interface 40 which makes a request of the database manager 44 to retrieve the contents of the third plurality of fields 96 shown in the building record shown in FIGS. 6A and 6B. It will be recalled that the third plurality of fields 96 includes the category 144, 148, 150, 152, 154, 156, 158, 160 and 162 and general data fields 164–176 of the building record 90.

It will be recalled that the contents of the category fields 144–162 are decimal numbers. These numbers are converted into binary format by the HTML module 48 to produce a series of 0's and 1's representing whether or not certain predefined statements of a key associated with the region in which the building is situated, are to be presented to the user i.e. included in an agent's notes HTML file to be sent to the user's browser. The statements associated with the key, in this embodiment, are shown in FIGS. 8A–8J. Thus, FIGS. 8A–8J define key statements for encoding and key statements for decoding the contents of the category fields 144–162 in the building record 90 shown in FIG. 6A.

Only the statements which are defined as being active by the contents of the building record field for a particular category are included in the HTML file produced by the HTML module 48. Thus, only statements relevant to the building are included in the agent's notes HTML file produced by the HTML module 48.

As for the general data fields 164, 166, 168, 170, 172, 174 and 176, the contents of these fields are applied to the corresponding statements as shown in FIGS. 9A–9J to act as variables within the corresponding statement. For example, the value 1243 is retrieved from the floorsize field 190 of the building record 90 shown in FIG. 6A and is used to form the statement "Typical floor size is 1243 $m^2$" and a character string for this statement is included in the agent's notes HTML file. In this manner, the contents of the general data fields 164–176 of the building record 90 are used with the general data key shown in FIGS. 9A–9J to produce statements in an agent's notes HTML file which is transmitted to the user's browser for display at the user terminal.

FIGS. 14A and 14B

Referring to FIGS. 14A and 14B, an agent's notes display produced at the user's browser in response to the agent's notes HTML file is shown generally at 260.

The user's browser is operable to produce messages indicative of a desired change to a specific field in a building information record. For example, while viewing the agents notes display, the user may request to change the contents of the typical floor size from 1243 $m^2$ to 1300 $m^2$. To do this, within the browser, the user points to the typical floor size statement and enters the desired number representing the new floor size, and requests an update. In response to the update request, the browser transmits this number to the web interface 40, which requests the database manager to store the new number, 1300, in the floorsize field 190 of the corresponding building record.

Similarly, if the user desires to make a change to the inclusion of one of the predefined statements shown in FIG. 8, in a building record, the user simply uses his pointing device with in the browser, to point to the category and request an update. In response, the browser sends a message to the web interface 40, which passes the message to the database manager 44. The database manager 44 then reads the contents of the selected category field, locates the applicable key from those shown in FIGS. 8A–8J and provides a list of all available statements, with check marks beside the statements which are enabled for display, as determined by the contents of the selected category field 144–162 of the building record 90, and blanks beside those which are not enabled for display.

Using the pointing device, the user selects any desired statements from the list of available statements, thereby changing the inclusion or exclusion of the selected statement in the list of statements to be associated with the building. When the user has finished making selections, the user requests an update, which causes the user's browser to send an update message to the web interface 40. The web interface 40 passes the update message to the database manager 44 which produces a new binary number to represent the enabled/disabled state of each statement in the set of available statements. This new binary number is then converted into a decimal number and the decimal number is stored in the applicable category field 144–162. The database manager 44 then re-sends the contents of the third plurality of fields 96 in the building record 90 to the HTML module 48, to produce another agent's notes HTML file which is sent to the user's browser via the web interface 40. The user's browser reads the new agent's notes HTML file and displays a new display image updated to provide the information just entered by the user.

It will be appreciated, therefore, the Apache software, operating system, modem and processor circuit act as a web interface for communicating with at least one subscriber system to receive user input from a user at a subscriber system. In addition, it will be appreciated that the database manager amends the information records in response to user input received at the web interface from the subscriber system.

FIG. 15

As all changes to field contents in the database records are made through the database manager 44, the database manager detects when a change is made to a unit record, 200 in FIG. 10. When such a change is made, the contents of the unit id 202, building id 204 and region id field 100, of the corresponding building record 90 shown in FIG. 6A are copied into a mail queue buffer shown generally at 254 in FIG. 15. The mail queue buffer includes a record 253 having a building id field 256, a unit id field 255, a region field 257, and at Email address field 258.

FIG. 16

Mail Purge Routine

Figure 16:
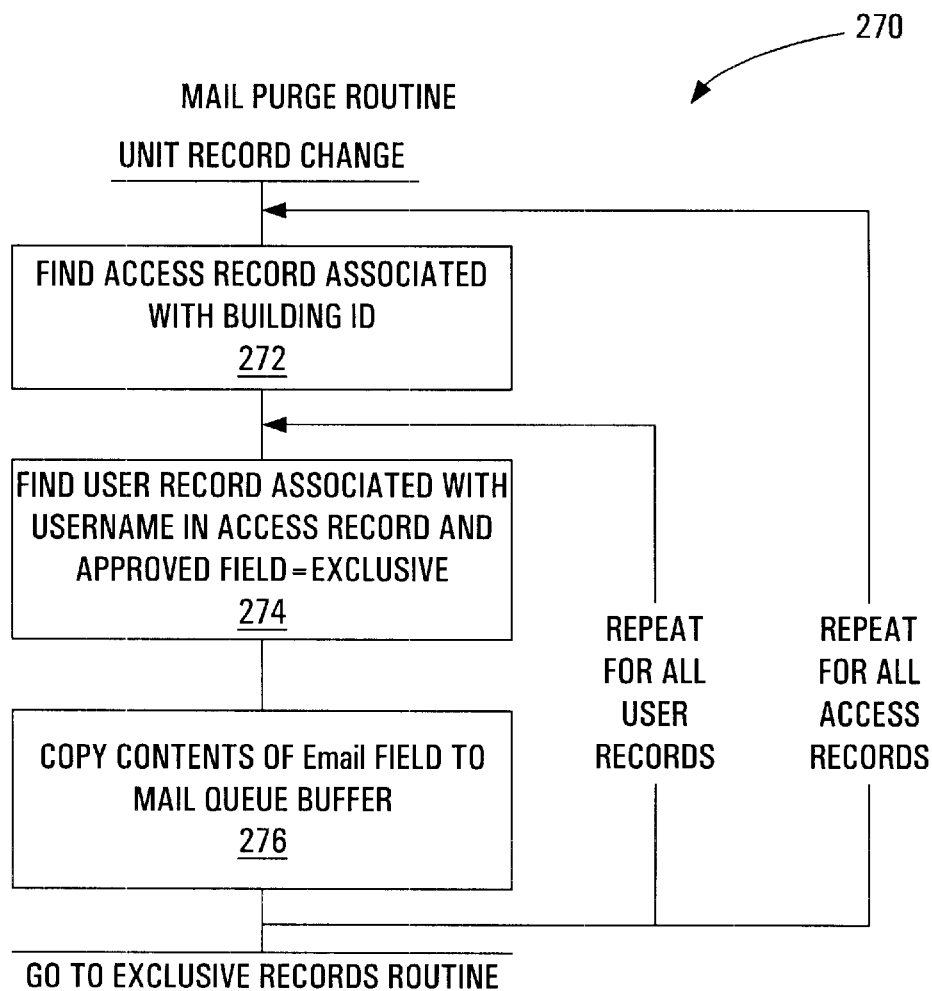
FIG. 16 is a flowchart of a mail purge routine run by the database server, according to the first embodiment of the invention.

When a change is made to a unit record 200, the database manager 44 runs a mail purge routine shown generally at 270 in FIG. 16. The mail purge routine 270 beings with block 272 which directs the processor to read the mail queue buffer 254 to locate a first record 253. Using the building id stored in the building id field 256, the block locates an access record 74 in the access table shown in FIG. 4, having the same building id code stored in its building id field 76. On finding such a record, block 274 directs the processor to locate a user record 62 as shown in FIG. 3, having a username field 64 with contents equal to the contents of the username field 78 in the access record located above, and an approved field 72 contents equal to exclusive. On finding such a record, block 276 directs the processor to copy the contents of the Email address field 66 of that user record 62 into the Email address field 258 of the first record 253 in the mail queue buffer.

The step of copying the contents of the Email address field 258 is repeated for each user record found in the search and the step of finding user records is repeated for each access record found having the same building id field 76 contents and the building id specified in the building id field 256 in the mail queue. In this manner, the Email addresses of all users associated with the building, and having exclusive selling rights, are identified and copied to the mail queue buffer 254. In effect therefore, the database manager scans the user records to obtain a distribution list of user records having the contents of at least one field associated with the contents of a predesignated field, ie., the building id field in at least one of the information records. In other words, the user name field is linked to the building id field through the access record.

FIG. 17

Figure 15:
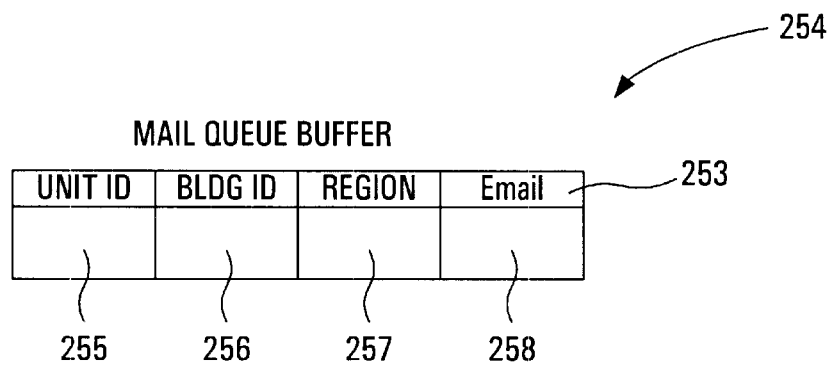
FIG. 15 is a representation of a mail queue buffer at a database server according to the first embodiment of the invention.
Figure 17:
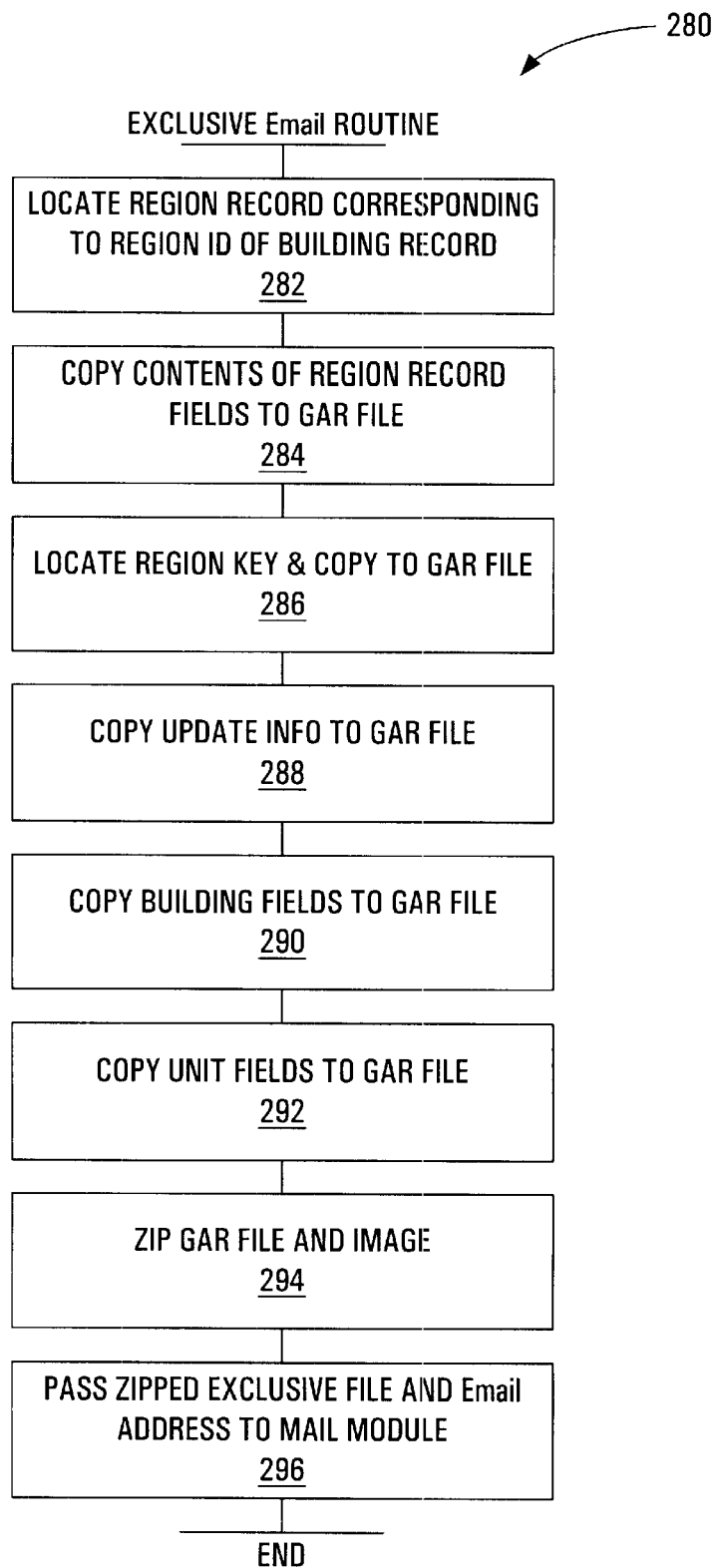
FIG. 17 is a flowchart of an exclusive mail routine run at the database server, according to the first embodiment of the invention.

The mail purge routine then calls the Exclusive Email routine shown at 280 in FIG. 17, which includes a first block 282 which directs the processor circuit to locate the region record 82 in FIG. 5 identified by the contents of the region field 257 of the record 253 in the mail queue buffer 254 shown in FIG. 15. Block 284 then directs the processor circuit to copy the contents of selected fields of the region record to a file arbitrarily named a "gar" file as shown generally at 285 in FIGS. 18A, 18B, 18C, 18D, 18E and 18F. The "gar" file thus includes a first portion shown generally at 287.

FIGS. 18A through 18F

Referring back to FIG. 17, block 286 then directs the processor circuit to locate the category keys associated with the identified region and copy them into the "gar" file. The category keys thus form a third portion 291 of the "gar" file shown in FIGS. 18A, 18B and 18C. Referring back to FIG. 17, block 288 then directs the processor circuit to produce update information regarding the unit and to copy this information to the "gar" file. The "gar" file thus has a fourth portion 293 shown in FIG. 18C.

Referring back to FIG. 17, block 290 then directs the processor circuit to copy the contents of each of the fields 98–176 of the building record 90 to the "gar" file to produce a fifth portion 295 shown in FIGS. 18C and 18D and block 292 directs the processor circuit to copy the contents of the fields of the unit record to the "gar" file to produce a sixth portion 297 shown in FIGS. 18E and 18F. A composite "gar" file is thus produced, the "gar" file having a format as shown in FIGS. 18A–18E. The gar file is created in the gar file area 39 of disk memory 34.

Thus, the system memory includes program codes for directing the processor to produce a composite file including the key and at least one of the building records.

Each time the system produces an exclusive gar file for a particular building, that gar file has the same name as the previously used name, which in this embodiment is in the form rrrrrnnn.gar, where rrrrr specifies the region, nnn specifies a building as identified by the contents of the building id field 102 and gar identifies the file as a gar file.

Referring back to FIG. 17, block 294 then directs the processor circuit to produce a compressed exclusive "zip" file including both the "gar" file and an image file or other file relating to the unit, the image file being stored in the image file area 35 of disk memory 34 and specified by the contents of the unitimagefilena field 118 of the building record 90. Thus, the system memory includes program codes for directing the processor to produce a compressed gar file including the key and at least one of the building records.

The compressed gar file and the Email address in the Email address field 258 of the mail queue buffer 254 are then passed to the send mail module 50, shown in FIG. 2.

The send mail module 50 transmits the compressed gar file to the indicated Email address, as a message using the simple mail transfer protocol (SMTP). In this embodiment, the system 12 also acts as an Email server and, therefore, a transfer box associated with the Email address is located at the system 12. Thus, the send mail module and processor circuit act as a message server in communication with the database manager for serving a message including at least one record from the plurality of information records to at least one user associated with the information record. In this embodiment, the message includes the compressed gar file.

Effectively, the dual Pentium processor circuit acts as a processor and the mail area 36 of the disk memory 34 acts as memory for storing program codes (the send mail module) readable by the processor to direct the processor to communicate with the database manager to obtain for inclusion in the message a plurality of information records ie., the building records and the unit records, having at least one common field entry, which in this embodiment is the contents of the region id field. In addition, it will be appreciated that the memory includes program codes for directing the processor to transmit the compressed file to each of the user addresses identified in the user address fields of the user records on the distribution list. The distribution list is the mail queue buffer.

Global File Routine

The database module also includes code for directing the processor circuit to execute a global file routine on a periodic basis, which in this embodiment is every 24 hours, at midnight.

Figure 19:
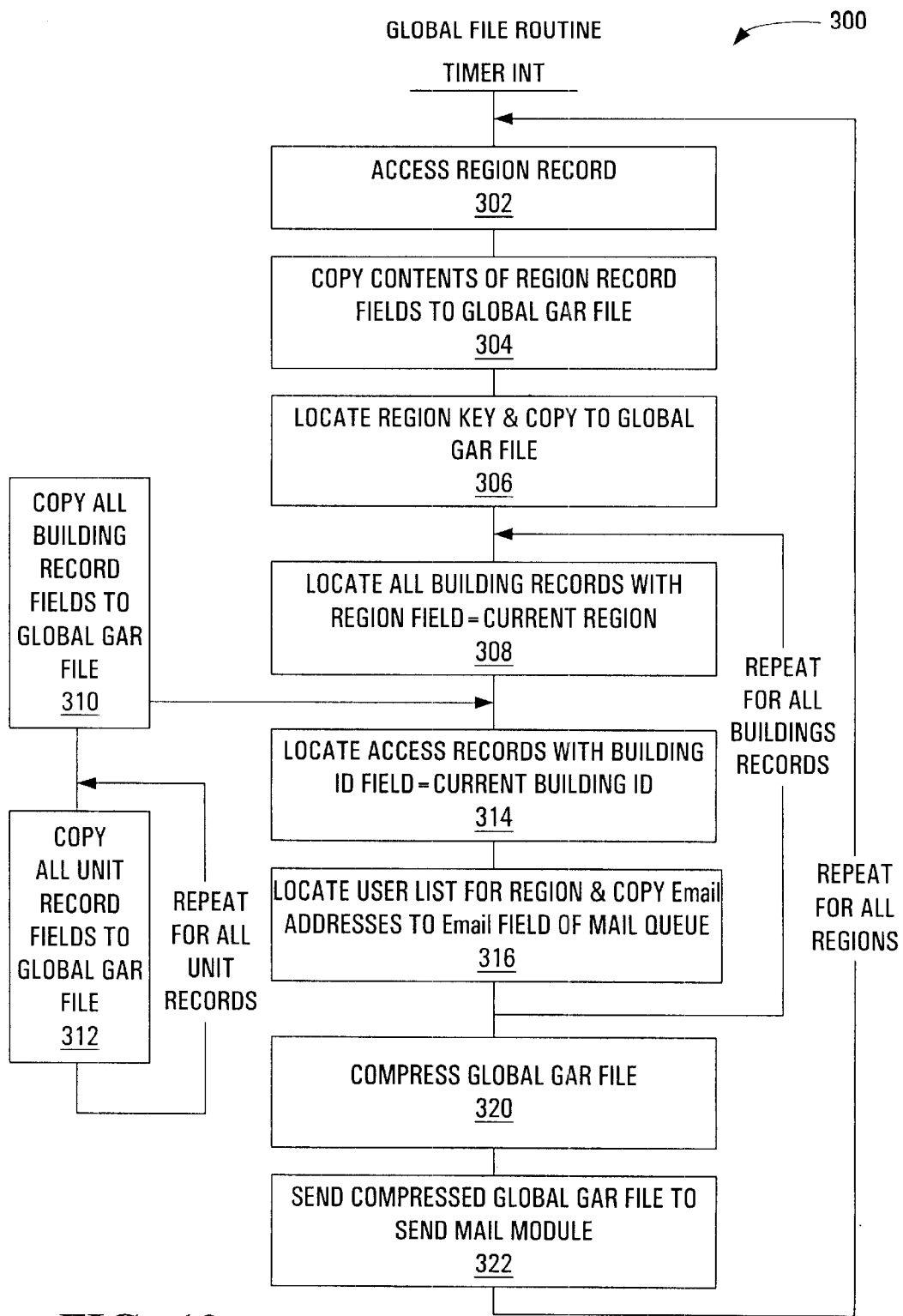
FIGS. 19A–19B is a flowchart of a global file routine run by the database system, according to the first embodiment of the invention.

FIGS. 19A and 19B

Referring to FIGS. 19A and 19B, the global file routine is shown generally at 300 and begins with block 302 which directs the processor circuit to access the first region record (82 in FIG. 5) in the database area 32. The first region is considered the current region at this time.

Block 304 then directs the processor circuit to copy the contents of selected fields to a global gar file in the gar file area 39 of the disk memory 34. Block 306 then directs the processor circuit to locate the region key and copy it to the global gar file. Block 308 then directs the processor circuit to locate a building record 90 having region id field 100 contents equal to the current region identified by the contents of the region id field 84 in the region record. Block 310 then directs the processor circuit to copy the contents of all building record fields 98–176 to the global gar file and block 312 directs the processor circuit to copy the contents of all unit record fields 202–225 of all unit records 200 shown in FIG. 10, to the global gar file. Block 312 is repeated until all unit records associated with a given building have been copied. This results in the addition of a seventh portion to the gar file shown in FIGS. 18A–18E, the seventh portion being shown in FIG. 18F. Thus, the building details and unit details of the building identified by the currently addressed building record are copied to the global gar file.

Referring back to FIGS. 19A and 19B, after copying the unit records for a given building, block 314 then directs the processor circuit to locate access records as shown at 74 in FIG. 4, having building id field 76 contents equal to the current building id. Block 316 then directs the processor circuit to locate a user list for the current region and copy the contents of the Email address fields of each corresponding user record to the Email address field 258 of the mail queue buffer 254 shown in FIG. 15. In effect therefore, the Email addresses of all users associated with the currently selected building record are copied to the mail queue buffer 254.

This process of copying the building and unit details to the global gar file and copying the Email addresses of users associated with a given region is repeated for each building record associated with the region record currently addressed, until all applicable building records have been accessed and included in the global gar file.

Each time the system produces a global gar file for a particular region, that gar file has the same name, which in this embodiment is in the form rrrrr000.gar, where rrrrr specifies a region, as identified by the contents of the region field 257 in the mail queue buffer 254 000 indicates that the file is global file and gar identifies the file as a gar file. successively produced gar files thus are written over previous gar files.

Referring back to FIGS. 19A and 19B, block 320 directs the processor to compress the global gar file, along with new image files associated with each region and stored in the image file area to produce a global compressed zip file. This global compressed zip file and the contents of the mail queue buffer 254 are then passed to the send mail module 50 shown in FIG. 11, which transmits the global zip file to each of the Email addresses in the mail queue buffer 254. Thus, each user subscribing to receive building information for a given region receives only the building information pertaining to buildings in that region.

Referring back to FIG. 19A, after the compressed global gar file for a region has been passed to the send mail module 50, the global file routine is repeated for the next successive region. Thus, a plurality of global zip files is successively produced and passed to the send mail module 50 until all building information records and unit records for each region have been transmitted to respective groups of users subscribing to receive information about respective regions.

It will be appreciated that the act of transmitting files to users using the simple mail transfer protocol involves transmitting the files to respective transfer boxes at the database system.

FIG. 20

User System

Figure 20:
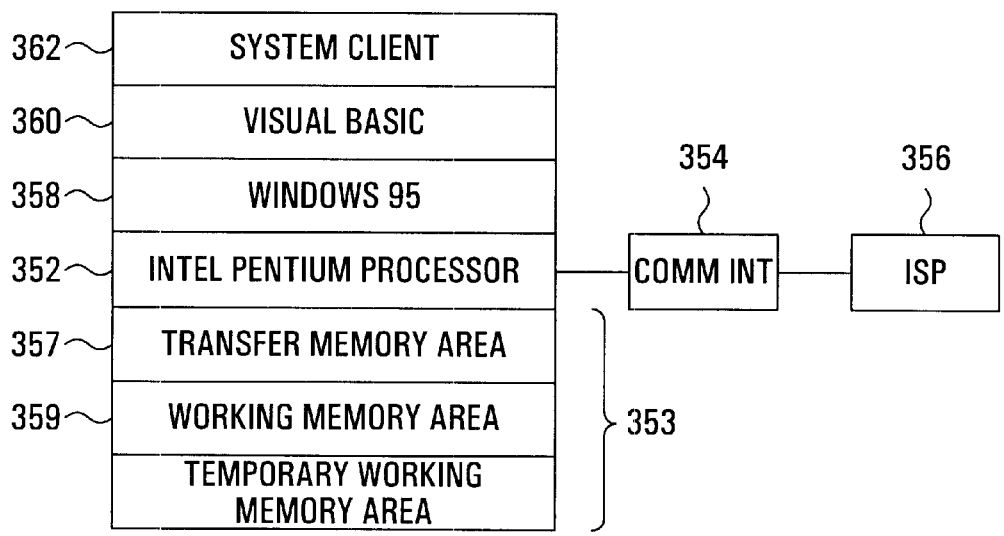
FIG. 20 is a schematic representation of a computer architecture implemented on a subscriber system of the database system as shown in FIG. 1.

Referring to FIG. 20, a representative subscriber system is shown in greater detail at 350. In this embodiment a subscriber system includes a processor circuit 352, which, in this embodiment includes an IBM-compatible computer having a communications interface such as a modem 354 for connecting to an internet services provider 356 providing internet access and Email services to the subscriber, and having disk memory 353. The processor circuit runs a Microsoft Windows95(R) operating system 358. Visual basic (R) 360 is run on the operating system. A system client application 362 runs on the Visual basic 360. The system client application divides the disk memory 353 to include a transfer memory area 357 and a working memory area 359.

FIG. 21

Figure 21:
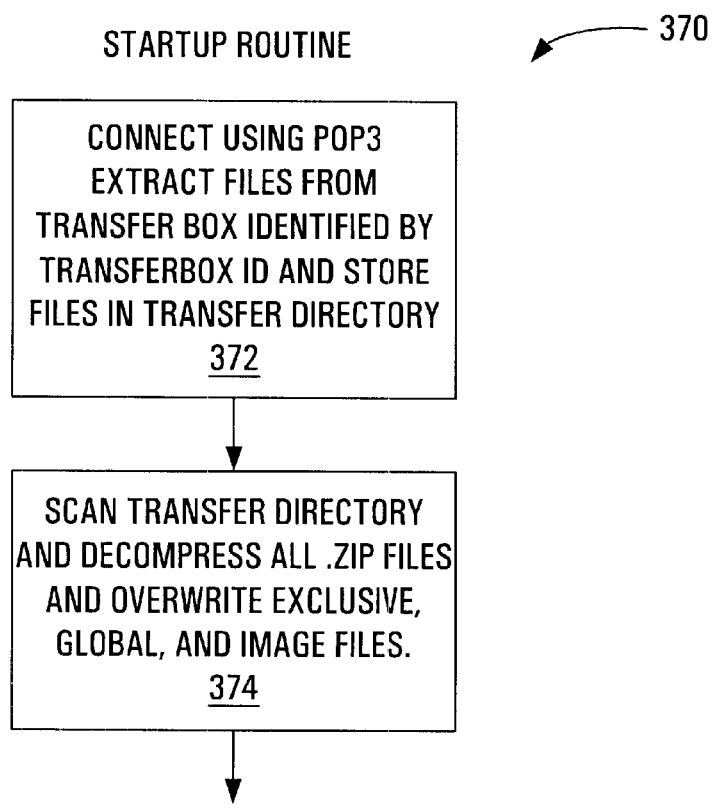
FIG. 21 is a flowchart of a startup routine run at the subscriber system, according to the first embodiment of the invention.

Referring to FIG. 21, the system client application software includes a startup routine 370 which is run whenever the subscriber system is powered on or an update is requested by the user. The startup routine 370 begins with block 372 which directs the processor circuit to establish a communications link between the subscriber system 350 shown in FIG. 20 and the internet services provider 356 using the POP3 protocol and to retrieve files from the corresponding Email transfer box at the system 12. Any files in the transfer box are copied to the transfer memory area 357. Thus, the processor circuit acts as a message receiver for receiving a message including at least one file, from the database system. It will be appreciated that the message receiver receives at least one file in an Email message, according to the simple mail transfer protocol.

Referring back to FIG. 21, block 374 then directs the processor circuit to decompress all compressed files, which may be exclusive "gar" files or global "gar" files, overwriting any existing files by the same names in the transfer directory. The existing exclusive and global gar files are thus replaced with new files by the same names. Thus, the subscriber processor memory includes processor-readable codes for directing the subscriber processor circuit to replace existing files in the transfer memory with new files received from the database.

Upon replacement of existing files, the startup routine is ended.

Figure 22:
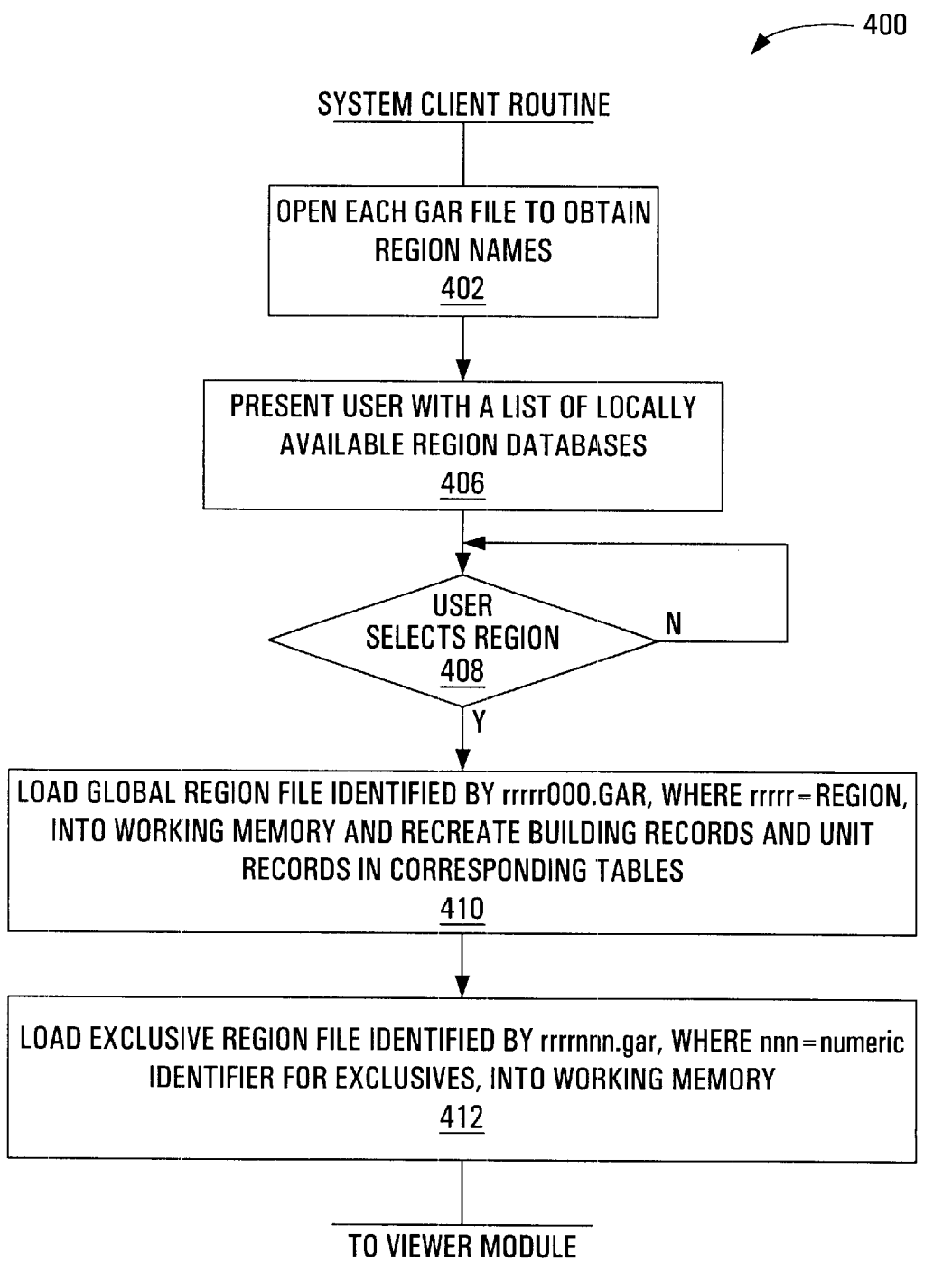
FIG. 22 is a flowchart of a system client routine run at the subscriber system, according to the first embodiment of the invention.

FIG. 22
System Client Routine

When the user desires to view information about a building, the user starts the system client routine shown at 400 in FIG. 22, which begins with block 402 which directs the subscriber processor circuit to open each gar file in the transfer memory area 357 to obtain region names, which appear as the first field in the file as shown at 404 in FIG. 18A. Thus, the subscriber processor memory includes processor-readable codes for directing the processor circuit to identify each file received from the database. More particularly, the subscriber processor memory includes processor-readable codes for directing the subscriber processor circuit to read a pre-defined portion of the file to identify the pre-defined characteristic, ie., the region name. Block 406 then directs the subscriber processor circuit to present the user with a list of regions for which building information is locally available at the subscriber's system. Thus, the subscriber processor memory includes processor-readable codes for directing the subscriber processor circuit to present to a user a list of the predefined characteristics associated with the file, the region identification being the predefined characteristic.

Block 408 directs the subscriber processor circuit to receive the user's selection of a region of interest and block 410 directs the subscriber processor circuit to load the global gar file corresponding to the user's selection into. the working memory area 359. Thus, the subscriber processor memory includes processor-readable codes for directing the subscriber processor circuit to transfer to working memory at least one file identified by a user. Block 412 then directs the subscriber processor circuit to load the exclusive gar file having the same region identifier into the working memory 359 and to expand the gar file to reproduce the building records 90 shown in FIGS. 6A and 6B and unit records 200 shown in FIG. 10 from which the gar file was produced, in corresponding tables. The subscriber processor is then directed to the user interface module. Thus, the subscriber processor memory includes processor-readable codes for directing the processor circuit to reconstruct records from the file in the working memory 359.

Figure 23:
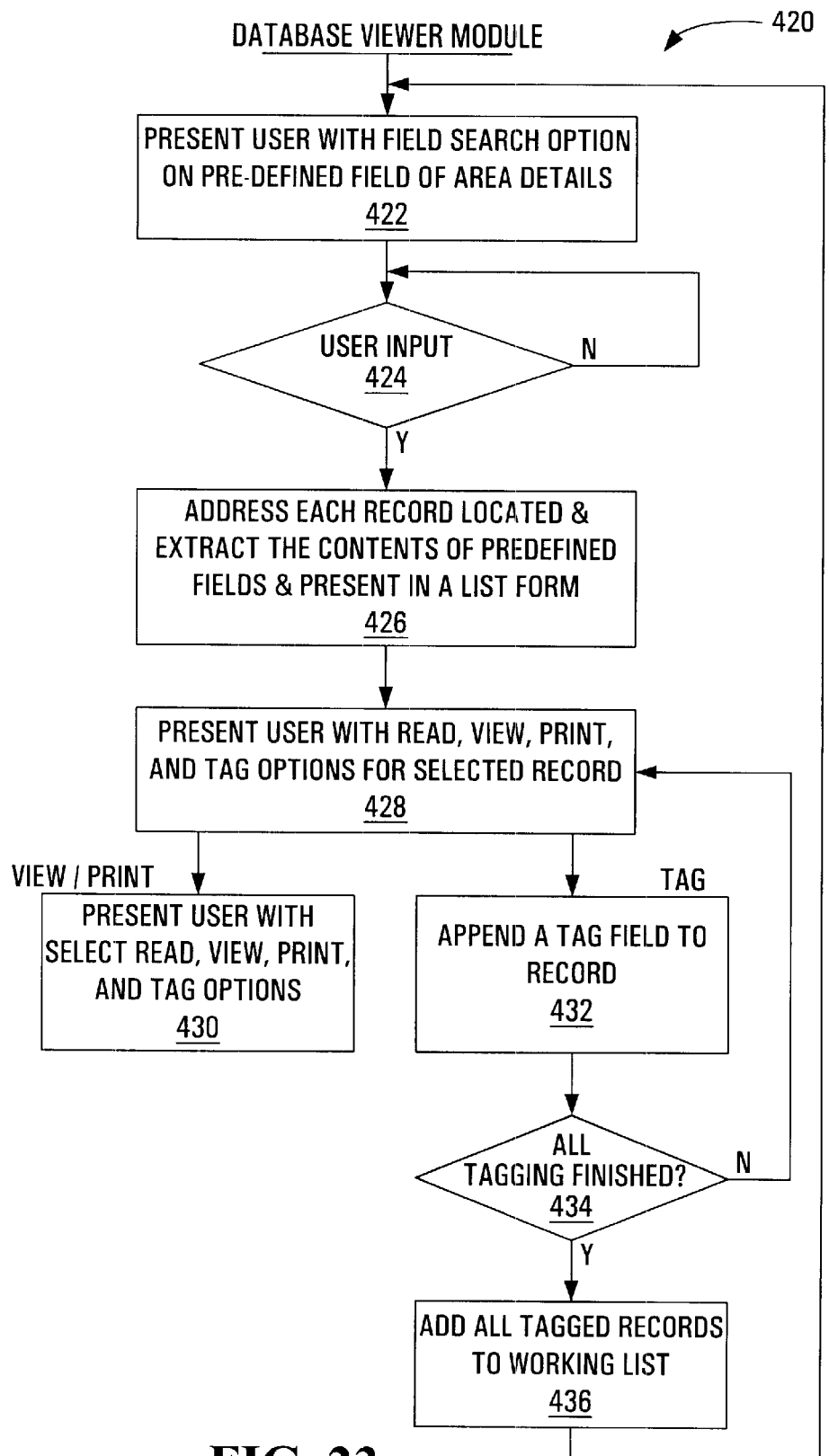
FIG. 23 is a flowchart of a database viewer module run at the subscriber system, according to the first embodiment of the invention.

FIG. 23
Database Viewer Module

Referring to FIG. 23, the database viewer module is shown generally at 420 and begins with block 422 which directs the processor circuit to present the user with search options for searching the contents of predefined fields of the building records and unit records in the working memory.

Block 424 the directs the processor to wait for user input identify search criteria in the form of a range of values or the like and block 426 directs the processor to search the building table and unit table to locate records meeting the search criteria and extract from those records the contents of predefined fields and use such contents in producing a display list from which the user can readily see relevant information about records meeting the search criteria. Thus, the subscriber processor memory includes processor-readable codes for directing the subscriber processor circuit to display the contents of at least some fields of the records.

The user may then select a particular record from the list, whereupon block 428 directs the processor to present the user with read, view, print and tag options for the selected record. To view a record, the processor circuit locates the key in the file stored in working memory and applies the contents of at least one field of the selected record to the key to produce a representation of encoded information stored in the field, depending whether the field is from the first, second or third plurality of fields. For example, in the case of the category fields or the string fields, the processor circuit displays at least one character string contained in the key, the character string being identified by the contents of a corresponding field in the record.

If the user selects to view or print a record, block 430 directs the processor to present the user with predefined read, view, print and tag options.

If the user selects to tag a record, block 432 directs the processor to append a tag field to the record. Thus, the subscriber processor memory includes processor-readable codes for directing the subscriber processor circuit to tag at least one of the records in response to user input.

Block 434 then directs the processor to request user input to identify whether or not all tagging has been finished and if the user indicates that such tagging is not yet finished, the processor is directed back to block 428. If all tagging has been finished, block 436 directs the processor to add the tagged record to a temporary working area in the disk memory and the processor is directed back to block 422. In this manner, the user can accumulate tagged records in the temporary working area and later printout the contents of all tagged records, as desired. Thus, the subscriber processor memory includes processor-readable codes for directing the subscriber processor circuit to display the contents of at least some fields of the tagged records.

To summarize the present embodiment in more general terms, when a building is entered into the database, it is given a building code and the user id of the owner/agent designate. When an agent logs into the system, the system (using custom on line software) scans the on line database of buildings to find user id matches within building information. The agent is then presented with a listing of only those buildings for which he has been authorized the make entries or adjustments. If an agent has "owner" or unrestricted access to a building, he has the option of changing the basic information template (restricted access agents do not have this function) thus, there are multiple levels of access/ security on the system. Agents may add, delete, or amend any of the other fields of information. The system identifies who has access and determines what is allowed to be done.

Users log into the on line web page where they choose the type and frequency of that data. Custom on line software is then used to update the user or agents database preferences (data frequency and type) for later use by the system. When the scheduled data processing begins, each piece of data (as in the function described below) is processed (sorted, compressed and packaged) before being matched against the agents database and sent out to the appropriate users (ie., those agents who subscribed on line for that particular regional database). Any new building images that have been made available that day, will also be processed automatically by the system and added to the data package so the user will have the necessary graphical content for presentation as well as the raw data. The system will also determine and flag every change made during the relevant time frame and append this data to the data package in a separate list for each appropriate region. Numerous pieces of data can be processed and sent to the user in a singular data packet. The database is subject to various levels of compression to minimize download time of building data.

Data sorting is typically a scheduled event but can be triggered manually. The database can, if required, be sorted, compressed, and packaged on a regional basis resulting in a separate data package for each region. The data packages can be compressed a number of times before transmission. Compression of data during storage can be done by specially encoding the information with a proprietary algorithm, which can be interpreted by the off line computer based estimation application. The compression/encoding capabilities of the present invention dramatically reduces information file size and consequently greatly reduces transfer times from the on line to the off line components. In addition, an increased level of security is added to the data, as an unauthorized interception of the information would be viewed as unintelligible. According to the present invention, exclusive listing data can be initiated and sent immediately to a single person by a signal person or the same person. Additionally, the recipient does not have to request to receive information, if required, he or she can be individually targeted by other users or by a system administrator for information. This allows the present invention to operate in a two-way fashion, allowing an unlimited number of geographically diverse contributors to control the content that is processed and delivered to an unlimited number of recipients. The contributors and the recipients can be one in the same.

According to the present invention data packets can be sent to a holding area where they can be stored until the end user/recipient launches an off line computer based application. At which time this data is automatically transferred and interpreted seamlessly. This allows all data packets to be combined at load time and treated as a single data source which in turn can be handled automatically and seamlessly within the single application.

The technology of the present invention is adaptable to any number of software platforms.

In general, the invention is a hybrid of Internet and off line computer based technologies, yielding the benefits of both while solving the problems of unreliability and download speed restrictions, amongst others, of the Internet. The invention utilizes a dynamic, robust database that can be manipulated and controlled by either a central administrator or an unlimited number of end users or both. The compression/encoding technology that is utilized by the present invention dramatically reduces download times of relevant information from the on line component to the off line computer software. For example, the use of the simple mail transfer protocol allows users to receive and accumulate messages at a predefined message server and to retrieve such messages at any time or at their discretion. Consequently, messages are not lost. In addition, this allows a user to selectively review messages received over a period of time.

More particularly, the use of the simple mail transfer protocol gives the database system the ability to target all users or as few as a single user, each with a unique message. Also, as opposed to a push system, the database system disclosed herein has the ability to target and send an individual messages that he has made himself available to receive but has not specifically requested.

Furthermore, by keeping copies of records of interest to a user at the user's system, the user has instant access to database records. The use of the simple mail transfer protocol to transmit files containing new records to users allows user systems to be kept up-to-date and allows the user to be informed of any changes to database information.

The compression aspects of the invention drastically reduce the size of data files transferred to users and, hence, reduce the transfer time required to send messages to users. For example, with fifteen buildings, each with seven to ten pages of related information and each page being represented by fifteen kilobytes when stored as a text file, a file size of approximately 2250 kilobytes is created. A message containing such file can be downloaded to a user with the system described herein using a standard 28.8 kilobit/second modem in less than four seconds as opposed to the approximately twenty-five minutes it would take with current systems using a similar communications channel.

The data transfer technique disclosed herein is unique and innovative in its storage capabilities, its seamless functionality in the retrieval and processing of multiple data fields and in the delivery of an unlimited array of individual information elements. The off line computer based software of the present invention is industry specific and can be individually tailored for the specific end user application in many industries.

While specific embodiments of the invention have been described and illustrated, such embodiments should be considered illustrative of the invention only and not as limiting the invention as construed in accordance with the accompanying claims.

What is claimed is:

1. A remotely updatable database system comprising:
   a user interface for communicating with at least one subscriber system to receive user input from a user at said at least one subscriber system;
   a database of information records and user records, said information records having respective pluralities of fields and wherein each of said information records is linked to at least one user record;
   a database manager in communication with said user interface, for controlling said database such that each information record is associated with at least one user, and for amending said information records in response to user input received at said user interface from said at least one subscriber system; and
   a message server in communication with said database manager for serving a message including at least one record received from said database manager to said at least one user associated with said information record, said message server including a processor and memory for storing program codes readable by said processor to direct said processor to communicate with said database manager to obtain for inclusion in said message a plurality of information records having at least one common field entry.

2. An apparatus as claimed in claim 1 wherein said message server includes a processor and memory for storing program codes readable by said processor to direct said processor to communicate with said database manager to obtain for inclusion in said message at least one information record having at least one common field entry.

3. An apparatus as claimed in claim 1 wherein said database manager stores the contents of at least some of said information records in a compressed format.

4. An apparatus as claimed in claim 3 wherein said contents of at least one field of said information record includes at least one information code.

5. An apparatus as claimed in claim 4 wherein said at least one information code represents at least one of a plurality of predefined contents of said field.

6. An apparatus as claimed in claim 4 further including memory for storing a key identifying said predefined contents of each of said fields represented by said at least one information code.

7. An apparatus as claimed in claim 6 wherein said server memory includes program codes for directing said server processor to produce a composite file including said key and at least one of said information records.

8. An apparatus as claimed in claim 7 wherein said server memory includes program codes for directing said server processor to produce a compressed file including said key and at least one of said information records.

9. An apparatus as claimed in claim 8 wherein said compressed file includes an image file.

10. An apparatus as claimed in claim 9 wherein said message includes said compressed file.

11. An apparatus as claimed in claim 10 wherein said user records include a user address field for storing a user address to which a message produced by said message server is to be transmitted.

12. An apparatus as claimed in claim 11 wherein said memory includes program codes for directing said processor to direct said database manager to scan said user records to obtain a distribution list of user records having the contents of at least one field associated with the contents of a predesignated field in at least one of said information records.

13. An apparatus as claimed in claim 12 wherein said server memory includes program codes for directing said server processor to transmit said compressed file to each of said user addresses identified in said user address fields of said user records on said distribution list.

14. An apparatus as claimed in claim 4 wherein said at least one information code represents a quantitative measure of a predefined physical quantity.

15. An apparatus as claimed in claim 14 further including memory for storing a key identifying said predefined physical quantity.

16. An apparatus as claimed in claim 15 wherein said key includes a character string associated with said field.

17. An apparatus as claimed in claim 4 wherein said at least one information code identifies whether or not any of a plurality of pieces of information are to be associated with said record.

18. An apparatus as claimed in claim 17 wherein said at least one information code includes a decimal number representing a binary number having individual bits representing the inclusion or exclusion of a corresponding predefined piece of information.

19. An apparatus as claimed in claim 18 further including a key identifying said plurality of pieces of information.

20. An apparatus as claimed in claim 19 wherein said key includes a plurality of character strings associated with said field.

21. An apparatus as claimed in claim 1 wherein said user interface includes a web interface.

22. A method of maintaining and distributing database information, the method comprising:
communicating with at least one subscriber system to receive user input from a user at said at least one subscriber system;
maintaining a database of information records;
maintaining user records in said database and linking said user records with said information records;
controlling said database such that each information record is associated with at least one user, wherein controlling said database includes obtaining for inclusion in a message a plurality of information records having at least one common field entry;
amending said information records in response to user input from said at least one subscriber system; and
serving said message including said plurality of information records having at least one common field entry from said database to said at least one user associated with said information record.

23. A method as claimed in claim 22 wherein controlling said database includes obtaining for inclusion in said message at least one information record having at least one common field entry.

24. A method as claimed in claim 22 wherein controlling said database includes storing the contents of at least some of said information records in a compressed format.

25. A method as claimed in claim 24 wherein controlling said database includes storing at least one information code in at least one field in at least one information record.

26. A method as claimed in claim 25 further including representing at least one of a plurality of predefined contents of said field.

27. A method as claimed in claim 25 further including storing a key identifying said predefined contents of each of said fields represented by said at least one information code.

28. A method as claimed in claim 27 further including directing said server processor to produce a composite file including said key and at least one of said information records.

29. A method as claimed in claim 28 further including directing said server processor to produce a compressed file including said key and at least one of said information records.

30. A method as claimed in claim 29 further including an image file within said compressed file.

31. A method as claimed in claim 30 further including said compressed file in said message.

32. A method as claimed in claim 31 further including within said user records a user address field for storing a user address to which a message produced by said message server is to be transmitted.

33. A method as claimed in claim 32 further including scanning said user records to obtain a distribution list of user records having the contents of at least one field associated with the contents of a predesignated field in at least one of said information records.

34. A method as claimed in claim 33 further including transmitting said compressed file to each of said user addresses identified in said user address fields of said user records on said distribution list.

35. A method as claimed in claim 25 further including representing a quantitative measure of a predefined physical quantity.

36. A method as claimed in claim 35 further including storing a key identifying said predefined physical quantity.

37. A method as claimed in claim 36 further including within said key a character string associated with said field.

38. A method as claimed in claim 25 further including identifying whether or not any of a plurality of pieces of information are to be associated with said record.

39. A method as claimed in claim 38 further including storing a decimal number as said information code, said decimal number representing a binary number having individual bits representing the inclusion or exclusion of a corresponding predefined piece of information.

40. A method as claimed in claim 39 further including identifying said plurality of pieces of information in a key.

41. A method as claimed in claim 40 further including within said key a plurality of character strings associated with said field.

42. A remotely updatable database system comprising:
    means for communicating with at least one subscriber system to receive user input from a user at said at least one subscriber system;
    means for maintaining a database of information records;
    means for maintaining user records in said database and for linking said user records with information records;
    means for controlling said database such that each information record is associated with at least one user, said means for controlling said database including means for obtaining for inclusion in a message a plurality of information records having at least one common field entry;
    means for amending said information records in response to said user input from said at least one subscriber system; and
    means for serving said message including said plurality of information records having said at least one common field entry from said database to said at least one user associated with said information record.

43. An apparatus as claimed in claim 42 wherein said means for controlling said database includes means for obtaining for inclusion in said message at least one information record having at least one common field entry.

44. An apparatus as claimed in claim 42 wherein said means for controlling said database includes means for storing the contents of at least some of said information records in a compressed format.

45. An apparatus as claimed in claim 44 wherein said means for controlling said database includes means for storing at least one information code in at least one field in at least one information record.

46. An apparatus as claimed in claim 45 further including means for representing at least one of a plurality of predefined contents of said field.

47. An apparatus as claimed in claim 45 further including means for storing a key identifying said predefined contents of each of said fields represented by said at least one information code.

48. An apparatus as claimed in claim 47 further including means for directing said server processor to produce a composite file including said key and at least one of said information records.

49. An apparatus as claimed in claim 48 further including means for directing said server processor to produce a compressed file including said key and at least one of said information records.

50. An apparatus as claimed in claim 49 further including means for including an image file within said compressed file.

51. An apparatus as claimed in claim 50 further including means for including said compressed file in said message.

52. An apparatus as claimed in claim 51 further including means for including within said user records a user address field for storing a user address to which a message produced by said message server is to be transmitted.

53. An apparatus as claimed in claim 52 further including means for scanning said user records to obtain a distribution list of user records having the contents of at least one field associated with the contents of a predesignated field in at least one of said information records.

54. An apparatus as claimed in claim 53 further including means for transmitting said compressed file to each of said user addresses identified in said user address fields of said user records on said distribution list.

55. An apparatus as claimed in claim 45 further including means for representing a quantitative measure of a predefined physical quantity.

56. An apparatus as claimed in claim 55 further including means for storing a key identifying said predefined physical quantity.

57. An apparatus as claimed in claim 56 further including means for including within said key a character string associated with said field.

58. An apparatus as claimed in claim 45 further including means for identifying whether or not any of a plurality of pieces of information are to be associated with said record.

59. An apparatus as claimed in claim 58 further including means for storing a decimal number as said information code, said decimal number representing a binary number having individual bits representing the inclusion or exclusion of a corresponding predefined piece of information.

60. An apparatus as claimed in claim 59 further including means for identifying said plurality of pieces of information in a key.

61. An apparatus as claimed in claim 60 further including means for including within said key a plurality of character strings associated with said field.

62. A computer-readable storage medium on which is stored codes operable to direct a computer to maintain and distribute database information, by directing said computer to:
    communicate with at least one subscriber system to receive user input from a user at said at least one subscriber system;
    maintain a database of information records;
    maintain user records in said database and link said user records with information records;
    control said database such that each information record is associated with at least one user, wherein control said database includes obtain for inclusion in a message a plurality of information records having at least one common field entry;
    amend said information records in response to user input from said at least one subscriber system; and
    serve said message including said plurality of information records having said at least one common field entry from said database to said at least one user associated with said information record.

63. An apparatus for receiving database record information from a database containing a plurality of database records, the apparatus comprising:
    a) a message receiver for receiving a message from said database, said message including at least one file from said database;
    b) transfer memory for storing said at least one file;
    c) an output device for presenting information to a user; and
    d) a processor circuit in communication with said message receiver, said transfer memory and said output device, and processor memory programmed with processor-readable codes for directing said processor to direct said output device to present to the user a list of files stored in said local memory, the files included in said list having at least one predefined characteristic; and to direct said output device to present to the user at least some of the contents of at least one file having said at least one predefined characteristic.

64. An apparatus as claimed in claim 63 wherein said message receiver includes a receiver for receiving messages according to a mail transfer protocol.

65. An apparatus as claimed in claim 64 wherein said processor memory includes processor readable codes for directing said processor circuit to identify each file received from said database.

66. An apparatus as claimed in claim 65 wherein said processor memory includes processor readable codes for directing said processor circuit to read a pre-defined portion of said at least one file to identify said pre-defined characteristic.

67. An apparatus as claimed in claim 66 wherein said processor memory includes processor readable codes for directing said processor circuit to present to a user a list of said predefined characteristics associated with said at least one file.

68. An apparatus as claimed in claim 67 wherein said processor memory includes processor readable codes for directing said processor circuit to transfer to working memory at least one file identified by a user.

69. An apparatus as claimed in claim 68 wherein said processor memory includes processor readable codes for directing said processor circuit to reconstruct records from said at least one file.

70. An apparatus as claimed in claim 69 wherein said processor memory includes processor readable codes for directing said processor circuit to display the contents of at least some fields of said records.

71. An apparatus as claimed in claim 70 wherein said processor memory includes processor readable codes for directing said processor circuit to locate at least one key in said at least one file and apply the contents of at least one field of at least one record to said at least one key to produce a representation of encoded information stored in said at least one field.

72. An apparatus as claimed in claim 71 wherein said processor memory includes processor readable codes for directing said processor circuit to display at least one character string contained in said key, said character string being identified by the contents of a corresponding field in said record.

73. An apparatus as claimed in claim 63 wherein said message receiver receives said least one file in an Email message.

74. An apparatus as claimed in claim 63 wherein said processor memory includes processor readable codes for directing said processor circuit to replace existing files in said transfer memory with new files received from said database.

75. An apparatus as claimed in claim 63 wherein said processor memory includes processor readable codes for directing said processor circuit to tag at least one of said records in response to user input.

76. An apparatus as claimed in claim 75 wherein said processor memory includes processor readable codes for directing said processor circuit to display the contents of at least some fields of said tagged records.

77. A method of presenting database record information from a database containing a plurality of database records, the method comprising:

receiving an Email message including at least one file from said database;

storing said at least one file in a transfer memory;

replacing existing files in said transfer memory with new files received from said database;

presenting to a user a list of files stored in said transfer memory, the files included in said list having at least one predefined characteristic; and presenting to said user the contents of at least one file having said at least one characteristic.

78. A method as claimed in claim 77 further including identifying each file received from said database.

79. A method as claimed in claim 78 further including reading a pre-defined portion of said at least one file to identify said pre-defined characteristic.

80. A method as claimed in claim 79 further including presenting to a user a list of said predefined characteristics associated with said at least one file.

81. A method as claimed in claim 80 further including transferring to working memory at least one file identified by a user.

82. A method as claimed in claim 81 further including reconstructing records from said at least one file.

83. A method as claimed in claim 82 further including displaying the contents of at least some fields of said records.

84. A method as claimed in claim 83 further including locating at least one key in said at least one file and applying the contents of at least one field of least one record to said at least one key to produce a representation of encoded information stored in said at least one field.

85. A method as claimed in claim 84 further including displaying at least one character string contained in said key, said character string being identified by the contents of a corresponding field in said record.

86. A method as claimed in claim 85 further including tagging at least one of said records in response to user input.

87. A method as claimed in claim 86 further including displaying the contents of at least some fields of said tagged records.

88. An apparatus for communicating database record information from a database containing a plurality of database records, the apparatus comprising:

means for receiving an Email message including at least one file, from said database;

means for storing said at least one file in local memory;

means for replacing existing files in said transfer memory with new files received from said database;

means for presenting to the user a list of files stored in said local memory, the files included in said list having at least one predefined characteristic; and means for presenting to said user the contents of at least one file having said at least one characteristic.

89. An apparatus as claimed in claim 88 further including means for identifying each file received from said database.

90. An apparatus as claimed in claim 89 further including means for reading a pre-defined portion of said at least one file to identify said pre-defined characteristic.

91. An apparatus as claimed in claim 90 further including means for presenting to a user a list of said predefined characteristics associated with said at least one file.

92. An apparatus as claimed in claim 91 further including means for transferring to working memory at least one file identified by a user.

93. An apparatus as claimed in claim 92 further including means for reconstructing records from said at least one file.

94. An apparatus as claimed in claim 93 further including means for displaying the contents of at least some fields of said records.

95. An apparatus as claimed in claim 94 further including means for locating at least one key in said at least one file and applying the contents of at least one field of least one record to said at least one key to produce a representation of encoded information stored in said at least one field.

96. An apparatus as claimed in claim 95 further including means for displaying at least one character string contained in said key, said character string being identified by the contents of a corresponding field in said record.

97. An apparatus as claimed in claim 88 further including means for tagging at least one of said records in response to user input.

98. An apparatus as claimed in claim 97 further including means for displaying the contents of at least some fields of said tagged records.

99. A computer-readable storage medium on which is stored codes operable to direct a computer to present database record information from a database containing a plurality of database records, by directing said computer to:

receive an Email message including at least one file from said database;

store said at least one file in a transfer memory;

replace existing files in said transfer memory with new files received from said database;

present to a user a list of files stored in said transfer memory, the files included in said list having at least one predefined characteristic; and present to said user the contents of at least one file having said at least one characteristic.

100. A remotely updatable database system comprising:

a) a central server and at least one subscriber system, said central server including:

i) a user interface for communicating with said at least one subscriber system to receive user input from a user at said at least one subscriber system;

ii) a database of information records;

iii) a database manager in communication with said user interface, for controlling said database such that each information record is associated with at least one user, and for amending said information records in response to user input received at said user interface from said at least one subscriber system; and iv) a message server in communication with said database manager for serving a message including at least one record received from said database manager to said at least one user associated with said information record.

b) said subscriber system including:

i) a message receiver for receiving a message from said message server, said message including at least one file from said database;

ii) transfer memory for storing said at least one file;

iii) an output device for presenting information to a user; and iv) a processor circuit in communication with said message receiver, said transfer memory and said output device, and processor memory programmed with processor-readable codes for directing said processor to direct said output device to present to the user a list of files stored in said local memory, the files included in said list having at least one predefined characteristic; and to direct said output device to present to the user at least some of the contents of at least one file having said at least one predefined characteristic.

\* \* \* \* \*